(12) United States Patent
Kato

(10) Patent No.: US 10,853,829 B2
(45) Date of Patent: Dec. 1, 2020

(54) ASSOCIATION METHOD, AND NON-TRANSITORY COMPUTER-READABLE STORAGE MEDIUM

(71) Applicant: FUJITSU LIMITED, Kawasaki (JP)

(72) Inventor: Shingo Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 15/928,888

(22) Filed: Mar. 22, 2018

(65) Prior Publication Data
US 2018/0276696 A1 Sep. 27, 2018

(30) Foreign Application Priority Data
Mar. 27, 2017 (JP) .................. 2017-061632

(51) Int. Cl.
*G06Q 10/00* (2012.01)
*G06Q 30/02* (2012.01)
(Continued)

(52) U.S. Cl.
CPC ....... *G06Q 30/0205* (2013.01); *G06F 16/285* (2019.01); *G06K 9/00288* (2013.01);
(Continued)

(58) Field of Classification Search
None
See application file for complete search history.

(56) References Cited

U.S. PATENT DOCUMENTS

| | | | |
|---|---|---|---|
| 2011/0021214 A1 | 1/2011 | Nakaji | |
| 2011/0052086 A1* | 3/2011 | Tobita | H04N 9/8205 382/224 |

(Continued)

FOREIGN PATENT DOCUMENTS

| | | |
|---|---|---|
| JP | 5-6500 | 1/1993 |
| JP | 2009-260583 | 11/2009 |

(Continued)

OTHER PUBLICATIONS

Takahashi, Dean, Here's how to check if someone is spying on you or tailing you, Aug. 11, 2014, Venture Beat, https://venturebeat.com/2014/08/11/detecting-if-someone-is-spying-on-you-or-tailing-you/, p. 1-7.*

(Continued)

*Primary Examiner* — Joseph M Waesco
(74) *Attorney, Agent, or Firm* — Fujitsu Patent Center

(57) ABSTRACT

An association method executed by a computer, the association method including obtaining a plurality of images captured by a plurality of cameras, acquiring at least one identifier of at least one radio terminal that is located near one of the plurality of cameras when at least one of the plurality of cameras captures one of the plurality of images, obtaining attributes corresponding to one or more person included in a group of images based on an analysis regarding the group of images, the group of images being included in the plurality of images and corresponding to a first identifier included in the at least one identifier, determining an attribute corresponding to the first identifier based on a result of the obtaining the attributes, and storing, into a storage device, the determined attribute in association with the first identifier.

8 Claims, 29 Drawing Sheets

| TIME | IMAGING DEVICE | GROUP NAME | MEN IN THEIR 20S | MEN IN THEIR 30S | WOMEN IN THEIR 20S | WOMEN IN THEIR 30S |
|---|---|---|---|---|---|---|
| 10:00 | 2a | G1 | 0 | 1 | 1 | 1 |
| 10:00 | 2b | G2 | 0 | 0 | 1 | 0 |
| 11:00 | 2a | G1 | 0 | 1 | 1 | 1 |
| 11:00 | 2a | G3 | 0 | 0 | 2 | 0 |
| 11:00 | 2b | G2 | 0 | 0 | 1 | 0 |
| 12:00 | 2a | UNSORTED | 1 | 0 | 1 | 0 |
| 12:00 | 2a | G2 | 0 | 0 | 1 | 0 |
| 12:00 | 2a | G3 | 1 | 1 | 1 | 0 |
| 12:00 | 2a | G4 | 1 | 1 | 1 | 1 |

(51) Int. Cl.
 *H04W 4/02* (2018.01)
 *G06K 9/00* (2006.01)
 *G06F 16/28* (2019.01)
 *G06K 9/62* (2006.01)
 *G06F 16/51* (2019.01)

(52) U.S. Cl.
 CPC ..... *G06K 9/00744* (2013.01); *G06K 9/00771* (2013.01); *G06K 9/6218* (2013.01); *G06K 9/6267* (2013.01); *H04W 4/023* (2013.01); *G06F 16/51* (2019.01)

(56) References Cited

U.S. PATENT DOCUMENTS

| | | | | |
|---|---|---|---|---|
| 2011/0169982 | A1* | 7/2011 | Yamakawa | G06F 16/58 348/231.2 |
| 2012/0041919 | A1* | 2/2012 | Nakamura | G06F 16/58 706/50 |
| 2012/0058726 | A1* | 3/2012 | Kato | G06F 21/85 455/41.2 |
| 2012/0109715 | A1* | 5/2012 | Wu | G06Q 30/0204 705/7.33 |
| 2012/0219219 | A1* | 8/2012 | Shimizu | G09G 3/3406 382/168 |
| 2013/0290565 | A1* | 10/2013 | Kamakura | G06F 21/40 709/245 |
| 2013/0301939 | A1* | 11/2013 | Ochi | G06F 16/337 382/224 |
| 2014/0010465 | A1* | 1/2014 | Mochizuki | G06K 9/6267 382/224 |
| 2014/0225925 | A1* | 8/2014 | Hayashi | G09G 5/36 345/634 |
| 2015/0324635 | A1* | 11/2015 | Tanaka | G06Q 40/00 348/150 |
| 2016/0026853 | A1* | 1/2016 | Wexler | G06F 1/163 382/103 |
| 2016/0224870 | A1* | 8/2016 | Mitsuhashi | G06K 9/6201 |
| 2016/0364883 | A1* | 12/2016 | Shiiyama | G06K 9/4642 |
| 2017/0046572 | A1* | 2/2017 | Ochi | G06K 9/6267 |
| 2018/0012079 | A1* | 1/2018 | Blanchflower | G06Q 10/067 |
| 2018/0027383 | A1* | 1/2018 | Seidman | H04W 8/005 455/456.1 |

FOREIGN PATENT DOCUMENTS

| | | |
|---|---|---|
| JP | 2010-160780 | 7/2010 |
| JP | 2017-49750 | 3/2017 |

OTHER PUBLICATIONS

JPOA—Office Action of Japanese Patent Application No. 2017-061632 dated Oct. 6, 2020 with Machine Translation.

\* cited by examiner

FIG. 6A

| TIME | RADIO TERMINAL | MEN IN THEIR 20S | MEN IN THEIR 30S | WOMEN IN THEIR 20S | WOMEN IN THEIR 30S |
|---|---|---|---|---|---|
| 10:00 | P1 | 0 | 2 | 1 | 0 |
| 11:00 | P1,P3 | 0 | 2 | 2 | 0 |
| 12:00 | P2,P3,P4 | 0 | 0 | 3 | 1 |

FIG. 6B

| TIME | RADIO TERMINAL | MEN IN THEIR 20S | MEN IN THEIR 30S | WOMEN IN THEIR 20S | WOMEN IN THEIR 30S |
|---|---|---|---|---|---|
| 10:00 | P2 | 0 | 0 | 1 | 0 |
| 11:00 | P2 | 0 | 0 | 1 | 1 |
| 12:00 | – | 2 | 0 | 0 | 0 |

FIG. 7

| RADIO TERMINAL | MEN IN THEIR 20S | MEN IN THEIR 30S | WOMEN IN THEIR 20S | WOMEN IN THEIR 30S |
|---|---|---|---|---|
| P1 | 0 | 4 | 3 | 0 |
| P2 | 0 | 0 | 5 | 1 |
| P3 | 0 | 2 | 5 | 1 |
| P4 | 0 | 0 | 3 | 1 |

FIG. 8

| RADIO TERMINAL | ATTRIBUTE |
|---|---|
| P1 | MEN IN THEIR 30S |
| P2 | WOMEN IN THEIR 20S |
| P3 | WOMEN IN THEIR 20S |
| P4 | WOMEN IN THEIR 20S |

FIG. 15A

| TIME | GROUP NAME | MEN IN THEIR 20S | MEN IN THEIR 30S | WOMEN IN THEIR 20S | WOMEN IN THEIR 30S | TOTAL NUMBER OF PERSONS |
|---|---|---|---|---|---|---|
| 10:00 | G1 | 0 | 1 | 1 | 1 | 3 |
| 11:00 | G1,G3 | 0 | 1 | 3 | 1 | 5 |
| 12:00 | G2,G3,G4 | 3 | 2 | 4 | 1 | 10 |

FIG. 15B

| TIME | GROUP NAME | MEN IN THEIR 20S | MEN IN THEIR 30S | WOMEN IN THEIR 20S | WOMEN IN THEIR 30S | TOTAL NUMBER OF PERSONS |
|---|---|---|---|---|---|---|
| 10:00 | G2 | 0 | 0 | 1 | 0 | 1 |
| 11:00 | G2 | 0 | 0 | 1 | 0 | 1 |
| 12:00 | - | 2 | 0 | 0 | 0 | 2 |

FIG. 16

| TIME | GROUP G1 | GROUP G2 | GROUP G3 | GROUP G4 |
|---|---|---|---|---|
| 10:00 | 3.00 | 1.00 | – | – |
| 11:00 | 2.50 | 1.00 | 2.50 | – |
| 12:00 | – | 3.33 | 3.33 | 3.33 |
| AVERAGE | 2.75 | 1.78 | 2.92 | 3.33 |

FIG. 17A

| TIME  | GROUP G1 | GROUP G2 | GROUP G3 | GROUP G4 |
|-------|----------|----------|----------|----------|
| 10:00 | 3.00     | –        | –        | –        |
| 11:00 | 2.43     | –        | 2.57     | –        |
| 12:00 | –        | 2.21     | 3.64     | 4.15     |

FIG. 17B

| TIME  | GROUP G1 | GROUP G2 | GROUP G3 | GROUP G4 |
|-------|----------|----------|----------|----------|
| 10:00 | –        | 1.00     | –        | –        |
| 11:00 | –        | 1.00     | –        | –        |
| 12:00 | –        | –        | –        | –        |

FIG. 18

| GROUP NAME | AVERAGE NUMBER OF GROUP PERSONS | ESTIMATED NUMBER OF PERSONS |
|---|---|---|
| G1 | 2.71 | 3 |
| G2 | 1.40 | 1 |
| G3 | 3.10 | 3 |
| G4 | 4.15 | 4 |

FIG. 19

| GROUP NAME | MEN IN THEIR 20S | MEN IN THEIR 30S | WOMEN IN THEIR 20S | WOMEN IN THEIR 30S |
|---|---|---|---|---|
| G1 | 0 | 2 | 4 | 2 |
| G2 | 3 | 2 | 6 | 1 |
| G3 | 3 | 3 | 7 | 2 |
| G4 | 3 | 2 | 4 | 1 |

FIG. 20

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | 3 | 0.00 | 0.75 | 1.50 | 0.75 |
| G2 | 1 | 0.25 | 0.17 | 0.50 | 0.08 |
| G3 | 3 | 0.64 | 0.64 | 1.50 | 0.43 |
| G4 | 4 | 1.20 | 0.80 | 1.60 | 0.40 |

FIG. 21A

| TIME | GROUP NAME | MEN IN THEIR 20S | MEN IN THEIR 30S | WOMEN IN THEIR 20S | WOMEN IN THEIR 30S |
|---|---|---|---|---|---|
| 10:00 | G1 | 0 | 1 | 1 | 1 |
| 11:00 | G1,G3 | 0 | 1 | 3 | 1 |
| 12:00 | G2,G3,G4 | 3 | 2 | 4 | 1 |

FIG. 21B

| TIME | GROUP NAME | MEN IN THEIR 20S | MEN IN THEIR 30S | WOMEN IN THEIR 20S | WOMEN IN THEIR 30S |
|---|---|---|---|---|---|
| 10:00 | G2 | 0 | 0 | 1 | 0 |
| 11:00 | G2 | 0 | 0 | 1 | 0 |
| 12:00 | – | 2 | 0 | 0 | 0 |

FIG. 22A

| GROUP NAME | NUMBER OF SORTED PERSONS | MEN IN THEIR 20S | MEN IN THEIR 30S | WOMEN IN THEIR 20S | WOMEN IN THEIR 30S |
|---|---|---|---|---|---|
| G1 | 0 | 0 | 0 | 0 | 0 |
| G2 | 0 | 0 | 0 | 0 | 0 |
| G3 | 0 | 0 | 0 | 0 | 0 |
| G4 | 0 | 0 | 0 | 0 | 0 |

FIG. 22B

| GROUP NAME | NUMBER OF SORTED PERSONS | MEN IN THEIR 20S | MEN IN THEIR 30S | WOMEN IN THEIR 20S | WOMEN IN THEIR 30S |
|---|---|---|---|---|---|
| G1 | 0 | 0 | 0 | 0 | 0 |
| G2 | 0 | 0 | 0 | 0 | 0 |
| G3 | 0 | 0 | 0 | 0 | 0 |
| G4 | 0 | 0 | 0 | 0 | 0 |

FIG. 23A

| TIME | GROUP NAME | MEN IN THEIR 20S | MEN IN THEIR 30S | WOMEN IN THEIR 20S | WOMEN IN THEIR 30S |
|---|---|---|---|---|---|
| 11:00 | G1,G3 | 0 | 1 | <u>1</u> | 1 |

FIG. 23B

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | <u>2</u> | 0.00 | 0.75 | <u>0.50</u> | 0.75 |
| G3 | <u>2</u> | 064 | 0.64 | <u>0.50</u> | 0.43 |

FIG. 23C

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | <u>1</u> | 0 | 0 | <u>1</u> | 0 |
| G3 | <u>1</u> | 0 | 0 | <u>1</u> | 0 |

FIG. 24A

| TIME | GROUP NAME | MEN IN THEIR 20S | MEN IN THEIR 30S | WOMEN IN THEIR 20S | WOMEN IN THEIR 30S |
|---|---|---|---|---|---|
| 11:00 | G1,G3 | 0 | <u>0</u> | 1 | <u>0</u> |

FIG. 24B

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | <u>0</u> | 0.00 | <u>-0.25</u> | 0.50 | <u>-0.25</u> |
| G3 | 2 | 064 | 0.64 | 0.50 | 0.43 |

FIG. 24C

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | <u>3</u> | 0 | <u>1</u> | 1 | <u>1</u> |
| G3 | 1 | 0 | 0 | 1 | 0 |

FIG. 25A

| TIME | GROUP NAME | MEN IN THEIR 20S | MEN IN THEIR 30S | WOMEN IN THEIR 20S | WOMEN IN THEIR 30S |
|---|---|---|---|---|---|
| 11:00 | G1,G3 | 0 | 0 | <u>0</u> | 0 |

FIG. 25B

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | 0 | 0.00 | -0.25 | 0.50 | -0.25 |
| G3 | <u>1</u> | 064 | 0.64 | <u>-0.50</u> | 0.43 |

FIG. 25C

| GROUP NAME | NUMBER OF UNSORTED PERSONS | MEN IN THEIR 20S | MEN IN THEIR 30S | WOMEN IN THEIR 20S | WOMEN IN THEIR 30S |
|---|---|---|---|---|---|
| G1 | 3 | 0 | 1 | 1 | 1 |
| G3 | <u>2</u> | 0 | 0 | <u>2</u> | 0 |

FIG. 26

| TIME | IMAGING DEVICE | GROUP NAME | MEN IN THEIR 20S | MEN IN THEIR 30S | WOMEN IN THEIR 20S | WOMEN IN THEIR 30S |
|---|---|---|---|---|---|---|
| 10:00 | 2a | G1 | 0 | 1 | 1 | 1 |
| 10:00 | 2b | G2 | 0 | 0 | 1 | 0 |
| 11:00 | 2a | G1 | 0 | 1 | 1 | 1 |
| 11:00 | 2a | G3 | 0 | 0 | 2 | 0 |
| 11:00 | 2b | G2 | 1 | 0 | 1 | 0 |
| 12:00 | 2a | UNSORTED | 0 | 0 | 1 | 0 |
| 12:00 | 2a | G2 | 1 | 1 | 1 | 0 |
| 12:00 | 2a | G3 | 1 | 1 | 1 | 1 |
| 12:00 | 2a | G4 | | | | |

FIG. 27

| GROUP NAME | MEN IN THEIR 20S | MEN IN THEIR 30S | WOMEN IN THEIR 20S | WOMEN IN THEIR 30S |
|---|---|---|---|---|
| G1 | 0 | 1 | 1 | 1 |
| G2 | 0 | 0 | 1 | 0 |
| G3 | 0.5 | 0.5 | 1.5 | 0 |
| G4 | 1 | 1 | 1 | 1 |

FIG. 28

| GROUP NAME | MEN IN THEIR 20S | MEN IN THEIR 30S | WOMEN IN THEIR 20S | WOMEN IN THEIR 30S |
|---|---|---|---|---|
| G1 | 0 | 1 | 1 | 1 |
| G2 | 0 | 0 | 1 | 0 |
| G3 | 0.6 | 0.6 | 1.8 | 0 |
| G4 | 1 | 1 | 1 | 1 |

FIG. 29

| GROUP NAME | MEN IN THEIR 20S | MEN IN THEIR 30S | WOMEN IN THEIR 20S | WOMEN IN THEIR 30S |
|---|---|---|---|---|
| G1 | 0 | 1 | 1 | 1 |
| G2 | 0 | 0 | 1 | 0 |
| G3 | 1 | 0 | 2 | 0 |
| G4 | 1 | 1 | 1 | 1 |

ASSOCIATION METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-61632, filed on Mar. 27, 2017, the entire contents of which are incorporated herein by reference.

FIELD

The embodiments discussed herein are related to an association method, and a non-transitory computer-readable storage medium.

BACKGROUND

In recent years, in real shops (hereinafter also merely referred to as shops), motions of shop visitors (hereinafter also referred to as users or persons) are analyzed using various methods. Specifically, for example, in the shops, shop visitors are classified for each of attributes (demographics) such as gender and age, and motions of the shop visitors are analyzed for each of the classified attributes.

Thus, in the shops, the results of analyzing the motions for each of the attributes are referenced, and the identification of products in which shop visitors are interested, the determination of methods of displaying products, and the like may be performed (refer to, for example, Japanese Laid-open Patent Publications Nos. 5-006500 and 2009-260583.

SUMMARY

According to an aspect of the disclosure, an association method executed by a computer, the association method including obtaining a plurality of images captured by a plurality of cameras, acquiring at least one identifier of at least one radio terminal that is located near one of the plurality of cameras when at least one of the plurality of cameras captures one of the plurality of images, obtaining attributes corresponding to one or more person included in a group of images based on an analysis regarding the group of images, the group of images being included in the plurality of images and corresponding to a first identifier included in the at least one identifier, determining an attribute corresponding to the first identifier based on a result of the obtaining the attributes, and storing, into a storage device, the determined attribute in association with the first identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams describing specific examples of detected attribute information;

FIG. 7 is a diagram describing a specific example of detection number information;

FIG. 8 is a diagram describing a specific example of identified attribute information;

FIGS. 15A and 15B are diagrams describing specific examples of detected number information;

FIG. 16 is a diagram describing a specific example of average detected number information;

FIGS. 17A and 17B are diagrams describing specific examples of sorted detected number information;

FIG. 18 is a diagram describing a specific example of estimated number information;

FIG. 19 is a diagram describing a specific example of total detected number information;

FIG. 20 is a diagram describing a specific example of detection index information;

FIGS. 21A and 21B are diagrams describing specific examples of unsorted number information;

FIGS. 22A and 22B are diagrams describing specific examples of sorted number information;

FIGS. 23A, 23B, and 23C are diagrams describing a specific example of process S54;

FIGS. 24A, 24B, and 24C are diagrams describing the specific example of process S54;

FIGS. 25A, 25B, and 25C are diagrams describing the specific example of process S54;

FIG. 26 is a diagram describing the specific example of process S54;

FIG. 27 is a diagram describing a specific example of average sorted number information;

FIG. 28 is a diagram describing a specific example of sorting index information; and FIG. 29 is a diagram describing a specific example of the sorting index information.

DESCRIPTION OF EMBODIMENTS

In the shops, in the aforementioned motion analysis, motion analysis (hereinafter also referred to as motion analysis using Wi-Fi) is performed using information acquired via Wi-Fi (traded mark: Wireless Fidelity) from radio terminals owned by shop visitors.

In the motion analysis using Wi-Fi, however, visitors' approval is to be obtained in order to acquire information to be used to determine attributes of shop visitors, for example. Thus, in the motion analysis using Wi-Fi, it may be difficult to acquire the attributes (information to be used to determine the shop visitors' attributes) of the shop visitors, depending on the results of obtaining the approval from the shop visitors.

According to an aspect, an object is to provide an association method, an information processing device, and an association program that identify attributes of users of radio terminals even if the attributes of the users are not acquired from the radio terminals.

Configuration of Information Processing System

Figure 1:
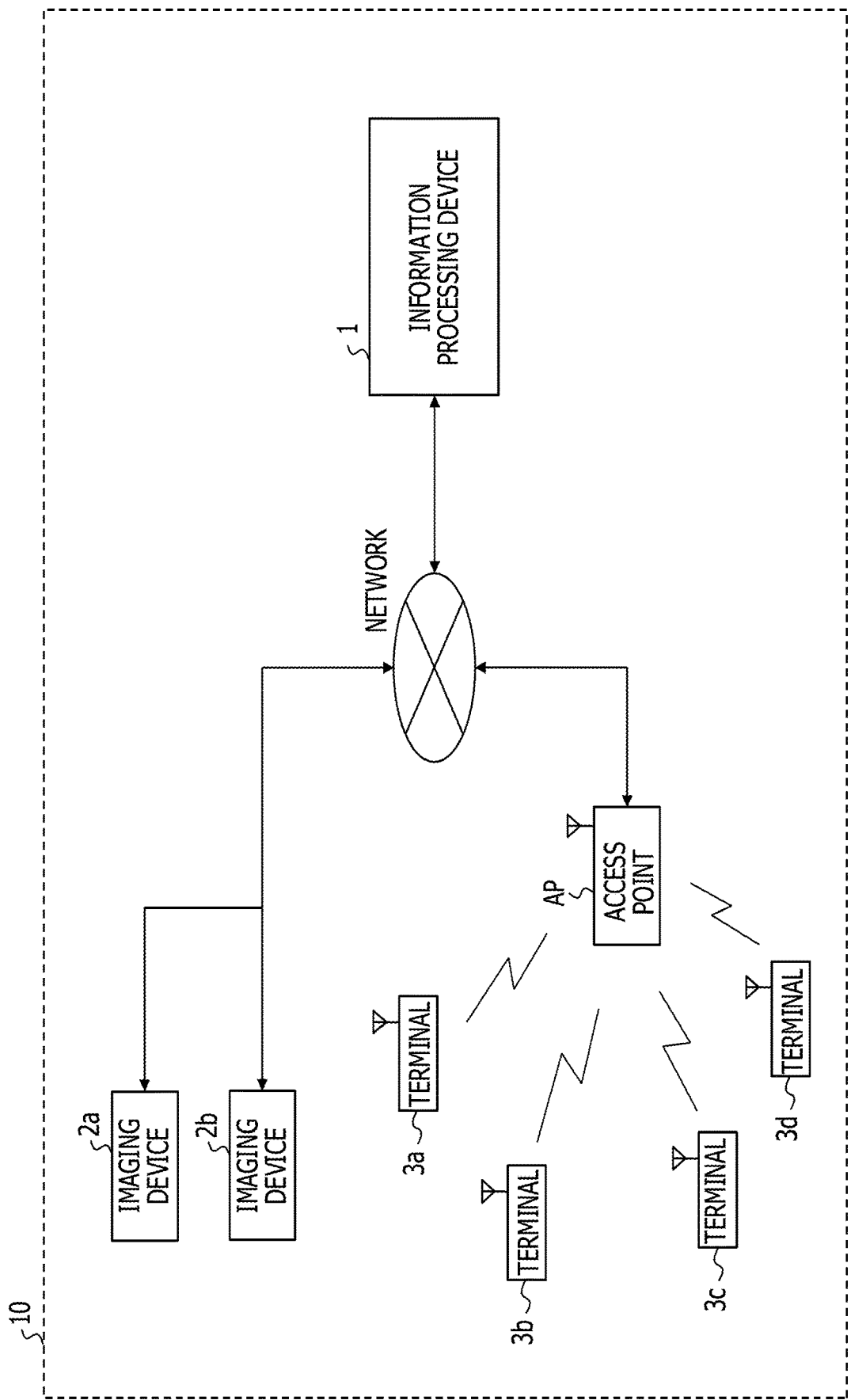
FIG. 1 is a diagram illustrating an entire configuration of an information processing system.

FIG. 1 is a diagram illustrating an entire configuration of an information processing system 10. The information processing system 10 illustrated in FIG. 1 includes an information processing device 1, imaging devices 2, and radio terminals 3 (hereinafter also merely referred to as terminals 3). The imaging devices 2 illustrated in FIG. 1 include imaging devices 2a and 2b. The radio terminals 3 illustrated in FIG. 1 include radio terminals 3a, 3b, 3c, and 3d.

The imaging devices 2 are, for example, cameras attached to shops and capture images of states within the shops during business hours of the shops. The imaging devices 2 analyze details of the captured images of the states within the shops and identify attributes of persons included in the captured images, for example. Specifically, the imaging devices 2 identify gender and age of the persons included in the captured images, for example.

The radio terminals 3 are mobile terminals that execute radio communication. For example, the radio terminals 3 are smartphones owned by shop visitors who visit the shops, or the like.

The information processing device 1 is composed of multiple physical machines and includes a central processing unit (CPU), a memory (dynamic random access memory (DRAM)), a hard disk (hard disk drive (HDD)), and the like.

In an example illustrated in FIG. 1, the information processing device 1 communicates with an access point AP via a network such as the Internet and a cable. The access point AP is a device that connects, to the network, the radio terminals 3 that execute radio communication.

Motion Analysis by Information Processing Device

The information processing device 1 illustrated in FIG. 1 analyzes motions of the shop visitors who visit the shops based on information included in the images captured by the imaging devices 2 and information acquired from the radio terminals 3, for example. Specifically, for example, the information processing device 1 classifies the shop visitors for each of attributes (demographics) such as gender and age and analyzes the motions of the shop visitors for each of the classified attributes.

Thus, in the shops, the results of executing the motion analysis for each of the attributes are referenced, and the identification of products in which the shop visitors are interested, the determination of methods of displaying products, and the like may be performed.

In the analysis of motions of shop visitors who visit the shops, the information processing device 1 illustrated in FIG. 1 executes the motion analysis using Wi-Fi and executes motion analysis (hereinafter also referred to as motion analysis using the cameras) using information included in images captured by the cameras, for example.

In the motion analysis using Wi-Fi, however, approval is to be obtained from shop visitors in order to acquire information to be used to determine attributes of the shop visitors. Thus, in the motion analysis using Wi-Fi, it may be difficult to acquire the attributes (information to be used to determine the shop visitors' attributes) of the shop visitors, depending on the results of obtaining approval from the shop visitors.

In addition, in the motion analysis using the cameras, shop visitors' motions made outside imaging ranges are not analyzed. Thus, in the motion analysis using the cameras, if the cameras are not sufficient the shops, shop visitors' motions may not be sufficiently analyzed.

The information processing device 1 according to a first embodiment acquires identification information items of radio terminals 3 located around and detected by the multiple imaging devices 2 and identifies multiple imaging devices 2 that have detected that a radio terminal 3 having a certain identification information item (hereinafter also referred to as first identification information item) is located around the multiple imaging devices 2.

Then, the information processing device 1 extracts attributes of persons included in images acquired from the identified multiple imaging devices 2 and captured at imaging time corresponding to time when the imaging devices 2 have detected that the radio terminal 3 having the first identification information item is located around the corresponding imaging devices 2. After that, the information processing device 1 identifies an attribute indicating statistical superiority among the extracted attributes.

Specifically, the persons included in the images captured by the imaging devices 2 around which the radio terminal 3 having the first identification information item is located may include a person who owns the radio terminal 3 having the first identification information item. Thus, the information processing device 1 according to the first embodiment associates, with the radio terminal 3 having the first identification information item, attributes of the persons included in the images captured by the imaging devices 2 around which the radio terminal 3 having the first identification information item has been located. Similarly, the information processing device 1 associates, for each of images captured by the multiple imaging devices 2, attributes of persons included in the images with radio terminals located around the imaging devices 2 upon the capture of the images.

Then, when the information is associated in the aforementioned manner, it is likely that frequencies at which the radio terminals 3 are associated with actual attributes of persons who own the radio terminals 3 are largest. Thus, the information processing device 1 determines that attributes associated with the radio terminals 3 the largest numbers of times are the attributes of the persons who own the radio terminals 3.

Thus, even if approval is not obtained from shop visitors, the information processing device 1 may associate radio terminals 3 owned by the shop visitors with attributes of the shop visitors included in images captured by and acquired from the imaging devices 2. Thus, a business operator may analyze motions of the shop visitors for each of the attributes of the shop visitors based on information (for example, positional information of the radio terminals 3) acquired from the radio terminals 3 via Wi-Fi.

Hardware Configuration of Information Processing Device

Figure 2:
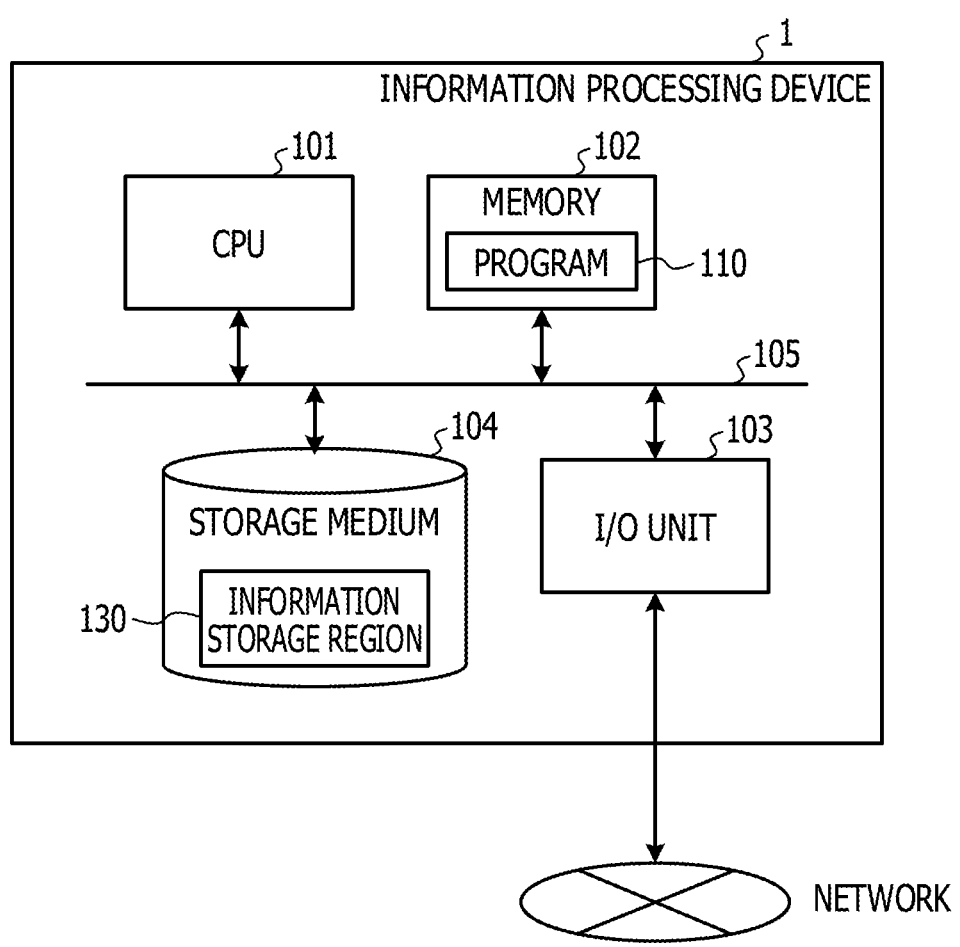
FIG. 2 is a diagram describing a hardware configuration of an information processing device.

Next, a hardware configuration of the information processing device 1 is described. FIG. 2 is a diagram describing the hardware configuration of the information processing device 1.

The information processing device 1 includes a CPU 101 serving as a processor, a memory 102, an external interface (I/O unit) 103, and a storage medium (storage) 104, as illustrated in FIG. 2. The units 101 to 104 are connected to each other via a bus 105.

The storage medium 104 stores, in a program storage region (not illustrated) within the storage medium 104, a program 110 for executing a process (hereinafter also referred to as association process) of associating shop visitors' attributes acquired from images captured by the imaging devices 2 with the radio terminals 3.

The CPU 101 loads the program 110 from the storage medium 104 into the memory 102 upon the execution of the program 110 and collaborates with the program 110 to execute the association process, as illustrated in FIG. 2.

The storage medium 104 includes an information storage region 130 (hereinafter also referred to as storage section 130) for storing information to be used during the execution of the association process, for example. In addition, the external interface 103 communicates with the imaging devices 2 and the radio terminals 3 via the network.

Software Configuration of Information Processing Device

Figure 3:
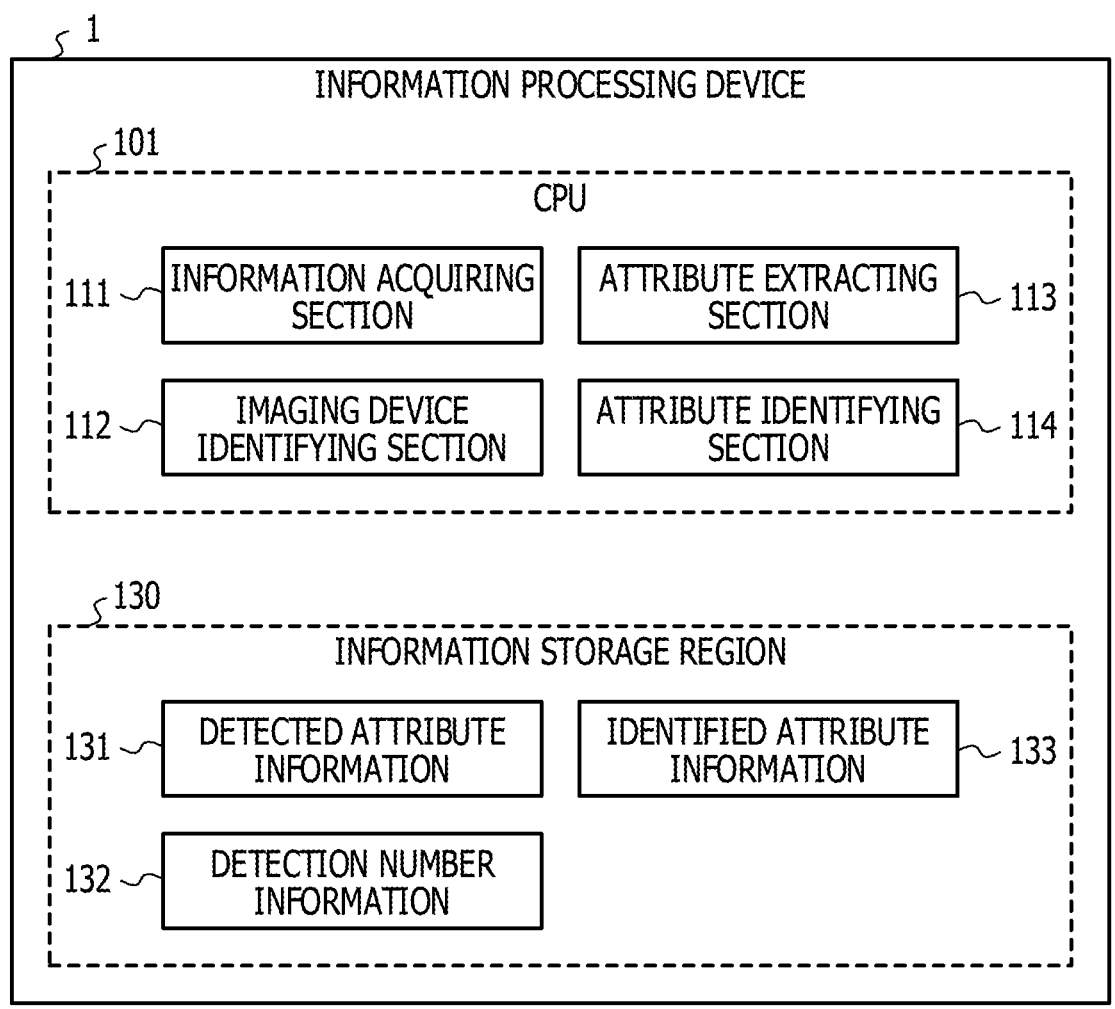
FIG. 3 is a functional block diagram of the information processing device.

Next, a software configuration of the information processing device 1 is described. FIG. 3 is a functional block diagram of the information processing device 1.

The CPU 101 collaborates with the program 110, thereby operating as an information acquiring section 111, an imaging device identifying section 112, an attribute extracting section 113, and an attribute identifying section 114, as illustrated in FIG. 3. In the information storage region 130, detected attribute information 131, detection number information 132, and identified attribute information 133 are stored, as illustrated in FIG. 3.

The information acquiring section 111 acquires identification information items of radio terminals 3 located around and detected by the multiple imaging devices 2. Specifically, the information acquiring section 111 references positional information acquired via Wi-Fi from the radio terminals 3 and indicating the positions of the radio terminals 3 and acquires the identification information items of the radio terminals 3 located around the imaging devices 2.

The imaging device identifying section 112 identifies multiple imaging devices 2 that have detected that the radio terminal 3 having the first identification information item among the identification information items acquired by the information acquiring section 111 is located around the multiple imaging devices 2.

The attribute extracting section 113 extracts attributes of persons included in images that have been acquired from the multiple imaging devices 2 identified by the imaging device identifying section 112 and have been captured at imaging time corresponding to time when the imaging devices 2 have detected that the radio terminal 3 having the first identification information item is located around the corresponding imaging devices 2.

The attribute identifying section 114 identifies, as an attribute to be associated with the radio terminal 3 having the first identification information item, an attribute indicating statistical superiority among the attributes extracted by the attribute extracting section 113. Specifically, the attribute identifying section 114 identifies, for each of the attributes, the numbers of times when the attributes have been extracted from the images captured by and acquired from the multiple imaging devices 2. Then, the attribute identifying section 114 identifies an attribute extracted the identified largest number of times as an attribute to be associated with the radio terminal 3 having the first identification information item. The information stored in the information storage region 130 is described later.

Overview of First Embodiment

Figure 4:
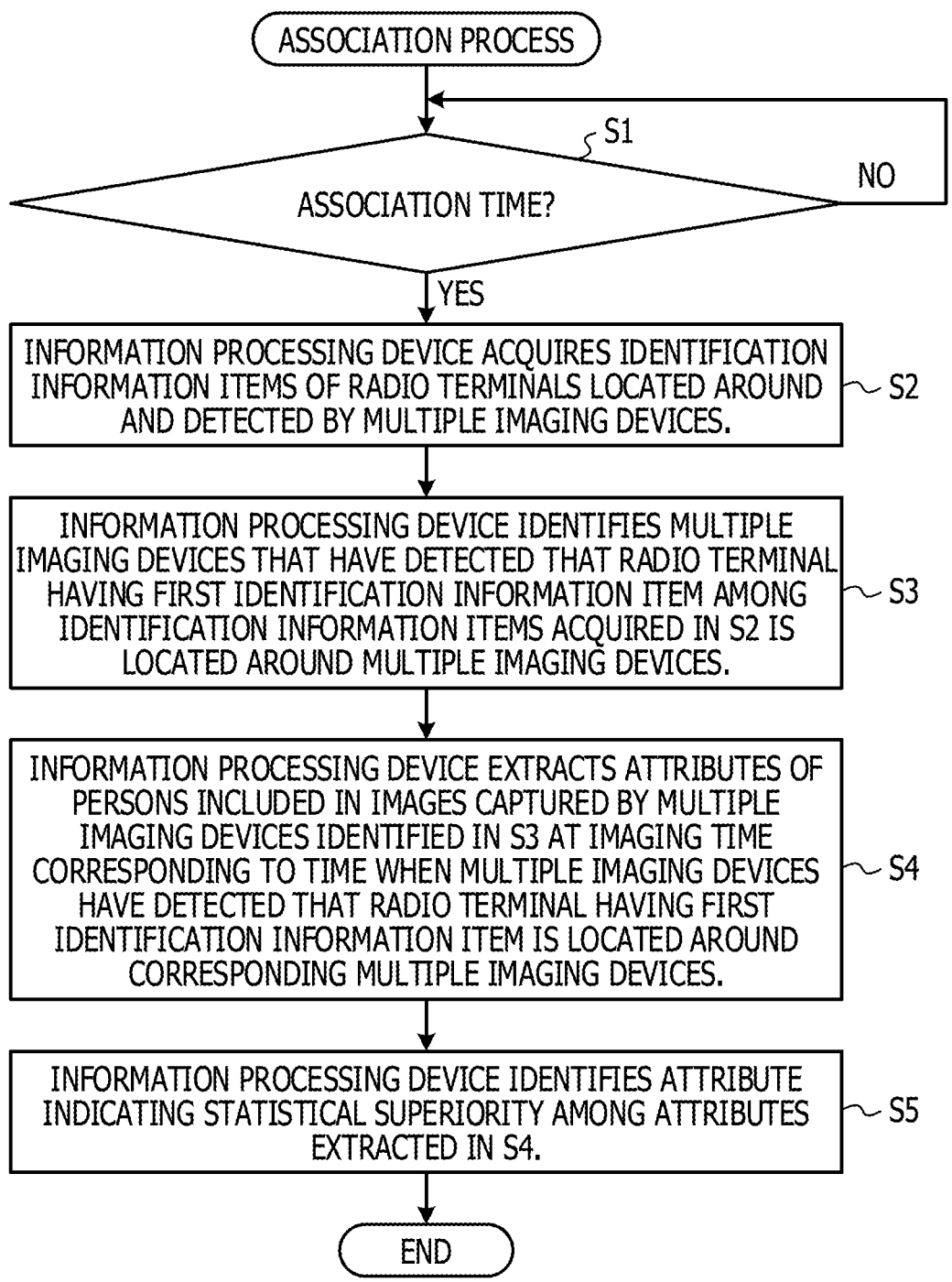
FIG. 4 is a flowchart describing an overview of an association process according to a first embodiment.

Next, an overview of the first embodiment is described. FIG. 4 is a flowchart describing an overview of the association process according to the first embodiment.

The information processing device 1 stands by until association time (NO in S1). The association time may be the time when a person in charge in a shop enters, in the information processing device 1, information indicating the start of the association process.

Then, when the current time reaches the association time (YES in S1), the information processing device 1 acquires identification information items of radio terminals 3 located around and detected by the multiple imaging devices 2 (in S2). Subsequently, the information processing device 1 identifies multiple imaging devices 2 that have detected that the radio terminal 3 having the first identification information item among the identification information items acquired in process S2 is located around the multiple imaging devices 2 (in S3).

After that, the information processing device 1 extracts attributes of persons included in images that have been acquired from the multiple imaging devices identified in process S3 and have been captured at imaging time corresponding to time when the imaging devices 2 have detected that the radio terminal 3 having the first identification information item is located around the corresponding imaging devices 2 (in S4). Then, the information processing device 1 identifies an attribute indicating statistical superiority among the attributes extracted in process S4 (in S5).

Thus, even if approval is not obtained from shop visitors, the information processing device 1 may associate radio terminals 3 owned by the shop visitors with attributes of the shop visitors included in images captured by and acquired from the imaging devices 2. Thus, the business operator may analyze motions of the shop visitors for each of the attributes of the shop visitors based on information (for example, positional information of radio terminals 3) acquired from the radio terminals 3 via Wi-Fi.

In a time zone in which persons to be analyzed are included in images captured by the imaging devices 2, the information processing device 1 may reference information included in the captured images and analyze motions of shop visitors. Thus, the information processing device 1 may analyze motions of shop visitors with high accuracy.

Details of First Embodiment

Figure 5:
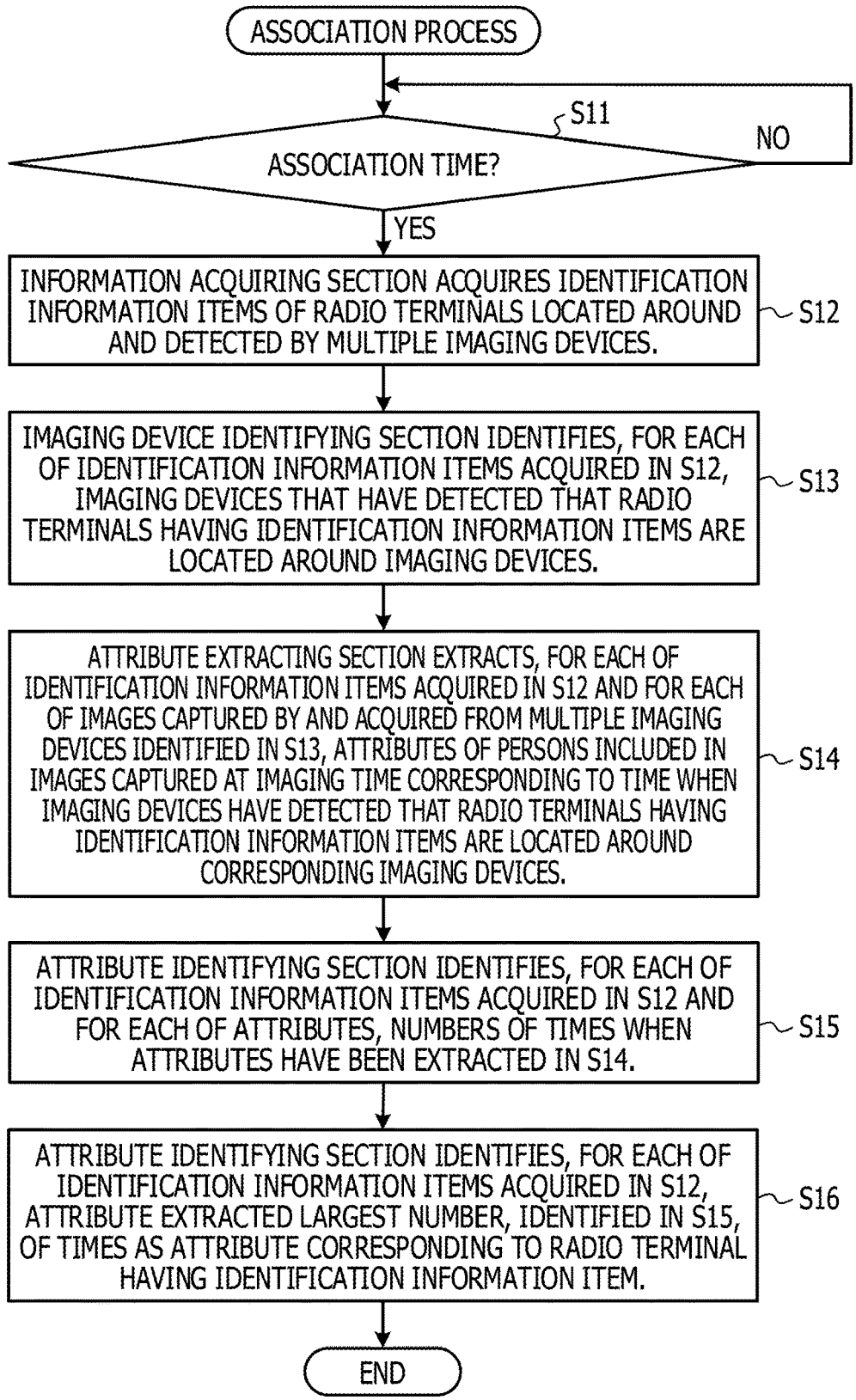
FIG. 5 is a flowchart describing details of the association process according to the first embodiment.

Next, details of the first embodiment are described. FIG. 5 is a flowchart describing details of the association process according to the first embodiment. In addition, FIGS. 6 to 8 are diagrams describing the details of the association process according to the first embodiment. The association process illustrated in FIG. 5 is described with reference to FIGS. 6 to 8.

The imaging acquiring section 111 of the information processing device 1 stands by until the association time (NO in S11). When the current time reaches the association time (YES in S11), the information acquiring section 111 acquires identification information items of radio terminals 3 located around and detected by the multiple imaging devices 2 (in S12).

Subsequently, the imaging device identifying section 112 of the information processing device 1 identifies, for each of the identification information items acquired in process S12, multiple imaging devices 2 that have detected that the radio terminals 3 having the identification information item items are located around the multiple imaging devices 2 (in S13).

After that, the attribute extracting section 113 of the information processing device 1 extracts, for each of the identification information items acquired in process S12 and for each of images captured by and acquired from the multiple imaging devices 2 identified in process S13, attributes of persons included in the images captured at imaging time corresponding to time when the corresponding imaging devices 2 have detected that the radio terminals 3 having the identification information items are located around the corresponding imaging devices 2 (in S14). Then, the attribute extracting section 113 generates detected attribute information 131 including the extracted attributes and causes the generated detected attribute information 131 to be stored in the information storage region 130, for example. Specific examples of the detected attribute information 131 are described below.

Specific Example of Detected Attribute Information

FIGS. 6A and 6B are diagrams describing the specific examples of the detected attribute information 131. Specifically, FIG. 6A is a diagram describing a specific example of detected attribute information 131a including attributes of persons included in images captured by the imaging device 2a described with reference to FIG. 1. FIG. 6B is a diagram describing a specific example of detected attribute information 131b including attributes of persons included in images captured by the imaging device 2b described with reference to FIG. 1.

The detected attribute information 131 illustrated in FIGS. 6A and 6B includes, as items, "time" indicating time when the imaging devices 2 have captured the images and "radio terminal" indicating identification information items of radio terminals 3 located around and detected by the imaging devices 2. In "radio terminal", "P1", "P2", "P3", and "P4" indicating identification information items of the radio terminals 3a, 3b, 3c, and 3d described with reference to FIG. 1 are set, for example. If a radio terminal 3 does not exist around an imaging device 2, "-" is set in "radio terminal".

In addition, the detected attribute information 131 illustrated in FIGS. 6A and 6B includes, as items, "men in their 20s" indicating the numbers of persons identified as men in their 20s and "men in their 30s" indicating the numbers of persons identified as men in their 30s. In addition, the detected attribute information 131 illustrated in FIGS. 6A and 6B includes, as items, "women in their 20s" indicating the numbers of persons identified as women in their 20s and "women in their 30s" indicating the numbers of persons identified as women in their 30s.

Specifically, in information in which "10:00" is set in "time" within the detected attribute information 131a illustrated in FIG. 6A, "P1" is set in "radio terminal", "0 (persons)" is set in "men in their 20s", "2 (persons)" is set in "men in their 30s", "1 (person)" is set in "women in their 20s", and "0 (persons)" is set in "women in their 30s".

Specifically, the detected attribute information 131a illustrated in FIG. 6A indicates that the radio terminal 3 having the identification information item "P1" has been located around the imaging device 2a at 10 o'clock. In addition, the detected attribute information 131a illustrated in FIG. 6A indicates that two men in their 30s and one woman in her 20s are included in an image captured by the imaging device 2a at 10 o'clock. A description of other information included in the detected attribute information 131a illustrated in FIG. 6A and information included in the detected attribute information 131b illustrated in FIG. 6B is omitted.

Return to FIG. 5. The attribute identifying section 114 of the information processing device 1 identifies, for each of the identification information items acquired in process S12 and for each of the attributes, the numbers of times when the attributes have been extracted in process S14 (in S15). Then, the attribute identifying section 114 generates detection number information 132 including the identified numbers of times and causes the generated detection number information 132 to be stored in the information storage region 130, for example. A specific example of the detection number information 132 is described below.

Specific Example of Detected Number Information

FIG. 7 is a diagram describing the specific example of the detection number information 132.

The detection number information 132 illustrated in FIG. 7 includes, as an item, "radio terminal" indicating the identification information items of the radio terminals 3 located around and detected by imaging devices 2. In addition, the detection number information 132 illustrated in FIG. 7 includes, as items, "men in their 20s" indicating the numbers of persons identified as men in their 20s among persons included in images captured by the imaging devices 2 and "men in their 30s" indicating the numbers of persons identified as men in their 30s among the persons included in the images captured by the imaging devices 2. In addition, the detection number information 132 illustrated in FIG. 7 includes, as items, "women in their 20s" indicating the numbers of persons identified as women in their 20s among the persons included in the images captured by the imaging devices 2 and "women in their 30s" indicating the number of persons identified as women in their 30s among the persons included in the images captured by the imaging devices 2.

Specifically, "0 (persons)" is set in "men in their 20s" in information (information in which "10:00" is set in "time" and information in which "11:00" is set in "time") in which "P1" is included in "radio terminal" within the detected attribute information 131a described with reference to FIG. 6A. In the detected attribute information 131b described with reference to FIG. 6B, information in which "P1" is included in "radio terminal" does not exist. Thus, the attribute identifying section 114 sets "0 (persons)" indicating the total of the numbers of persons in "men in their 20s" in information in which "P1" is set in "radio terminal" in process S15, as illustrated in FIG. 7.

In addition, "2 (persons)" is set in "men in their 30s" in the information (information in which "10:00" is set in "time" and information in which "11:00" is set in "time") in which "P1" is included in "radio terminal" within the detected attribute information 131a described with reference to FIG. 6A. In the detected attribute information 131b described with reference to FIG. 6B, information in which "P1" is included in "radio terminal" does not exist. Thus, the attribute identifying section 114 sets "4 (persons)" indicating the total of the numbers of persons in "men in their 30s" in the information in which "P1" is set in "radio terminal" in process S15, as illustrated in FIG. 7.

In addition, "3 (persons)" is set in "women in their 20s" in information (information in which "12:00" is set in "time") in which "P2" is included in "radio terminal" within the detected attribute information 131a described with reference to FIG. 6A. In addition, "1 (person)" is set in "women in their 20s" in information (information in which "10:00" is set in "time" and information in which "11:00" is set in "time") in which "P2" is included in "radio terminal" within the detected attribute information 131b described with reference to FIG. 6B. Thus, the attribute identifying section 114 sets "5 (persons)" indicating the total of the numbers of persons in "women in their 20s" in information in which "P2" is set in "radio terminal", as illustrated in FIG. 7. A description of other information illustrated in FIG. 7 is omitted.

Return to FIG. 5. The attribute identifying section 114 identifies, for each of the identification information items acquired in process S12, an attribute extracted the largest number identified in process S15 as an attribute to be associated with a radio terminal 3 having the identification information item (in S16). Then, the attribute identifying section 114 generates identified attribute information 133 including the identified attributes and causes the generated identified attribute information 133 to be stored in the information storage region 130. A specific example of the identified attribute information 133 is described below.

Specific Example of Identified Attribute Information

FIG. 8 is a diagram describing the specific example of the identified attribute information 133.

The identified attribute information 133 illustrated in FIG. 8 includes, as items, "radio terminal" indicating the identification information items of the radio terminals located around and detected by an imaging device 2 and "attribute" indicating attributes of owners who own the radio terminals 3 having the identification information items.

Specifically, in the detection number information 132 described with reference to FIG. 7, the maximum number among information set in "men in their 20s", "men in their 30s", "women in their 20s", and "women in their 30s" in the information in which "P1" is set in "radio terminal" is "4 (persons)" that is information set in "men in their 30s". Thus, the attribute identifying section 114 sets "men in their 30s" in "attribute" in information in which "P1" is set in "radio terminal" in process S16, as illustrated in FIG. 8. Specifically, in this case, the attribute identifying section 114 identifies "men in their 30s" as an attribute of the owner who owns the radio terminal 3 having the identification information item "P1". A description of other information illustrated in FIG. 8 is omitted.

As described above, the information processing device 1 according to the first embodiment acquires identification information items of radio terminals 3 located around and detected by the multiple imaging devices 2 and identifies multiple imaging devices 2 that have detected that the radio terminal 3 having the first identification information item is located around the multiple imaging devices 2.

Then, the information processing device 1 extracts attributes of persons included in images acquired from the identified multiple imaging devices 2 and captured at imaging time corresponding to time when the multiple imaging devices 2 have detected that the radio terminal 3 having the first identification information item is located around the corresponding multiple imaging devices 2. After that, the information processing device 1 identifies an attribute indicating statistical superiority among the extracted attributes.

Specifically, the persons included in the images captured by the imaging devices 2 around which the radio terminal 3 having the first identification information item has been located may include a person who owns the radio terminal 3 having the first identification information item. Thus, the information processing device 1 according to the first embodiment associates attributes of the persons included in the images captured by the imaging devices 2 around which the radio terminal 3 having the first identification information item has been located with the radio terminal 3 having the first identification information item. Similarly, the information processing device 1 associates, for each of images captured by the multiple imaging devices 2, attributes of persons included in the captured images with radio terminals 3 located around the imaging devices 2 upon the capture of the images.

When the information is associated in the aforementioned manner, it is likely that frequencies at which the radio terminals 3 are associated with the actual attributes of the persons who own the radio terminals 3 are largest. Thus, the information processing device 1 determines that attributes associated with the radio terminals 3 the largest numbers of times are the attributes of the persons who own the radio terminals 3.

Thus, even if approval is not obtained from shop visitors, the information processing device 1 may associate radio terminals 3 owned by the shop visitors with attributes of the shop visitors included in images captured by and acquired from the imaging devices 2. Thus, the business operator may analyze motions of the shop visitors for each of the attributes of the shop visitors based on information (for example, positional information of the radio terminals 3) acquired from the radio terminals 3 via Wi-Fi.

"2 (persons)" is set in "men in their 30s" in the information (information in which "10:00" is set in "time" and information in which "11:00" is set in "time") in which "P1" is set in "radio terminal" within the detected attribute information 131a described with reference to FIG. 6A. In the detected attribute information 131a described with reference to FIG. 6A, only "P1" is set in "radio terminal" in the information in which "10:00" is set in "time", while "P1" and "P3" are set in "radio terminal" in the information in which "11:00" is set in "time".

Thus, for example, the attribute identifying section 114 may calculate "2 (persons)" by dividing "2 (persons)" that is information set in "men in their 30s" in the information in which "10:00" is set in "time" by 1 that is the number of types of information set in "radio terminal" in the information in which "10:00" is set in "time". In addition, for example, the attribute identifying section 114 may calculate "1 (person)" by dividing "2 (persons)" that is information set in "men in their 30s" in the information in which "11:00" is set in "time" by 2 that is the number of types of information set in "radio terminal" in the information in which "11:00" is set in "time". Then, the attribute identifying section 114 may set "3 (persons)" obtained by summing the calculated "2 (persons)" and the calculated "1 (person)" in "men in their 30s" in the information in which "P1" is set in "radio terminal" within the detection number information 132.

Thus, even if the numbers of persons included in images captured by the imaging devices 2 significantly vary depending on captured locations and time zones in which the images are captured, the attribute identifying section 114 may reflect, in process results, attributes of persons included in images captured at locations where the numbers of shop visitors are small and captured in time zones in which the numbers of shop visitors are small.

Second Embodiment

Next, an association process according to a second embodiment is described.

If a group of multiple shop visitors exists in a shop, an information processing device 1 according to the second embodiment identifies the number of the persons included in the group and identifies attributes for the identified number of persons. In addition, the information processing device 1 according to the second embodiment identifies an attribute of a person who does not own a radio terminal 3.

Figure 9:
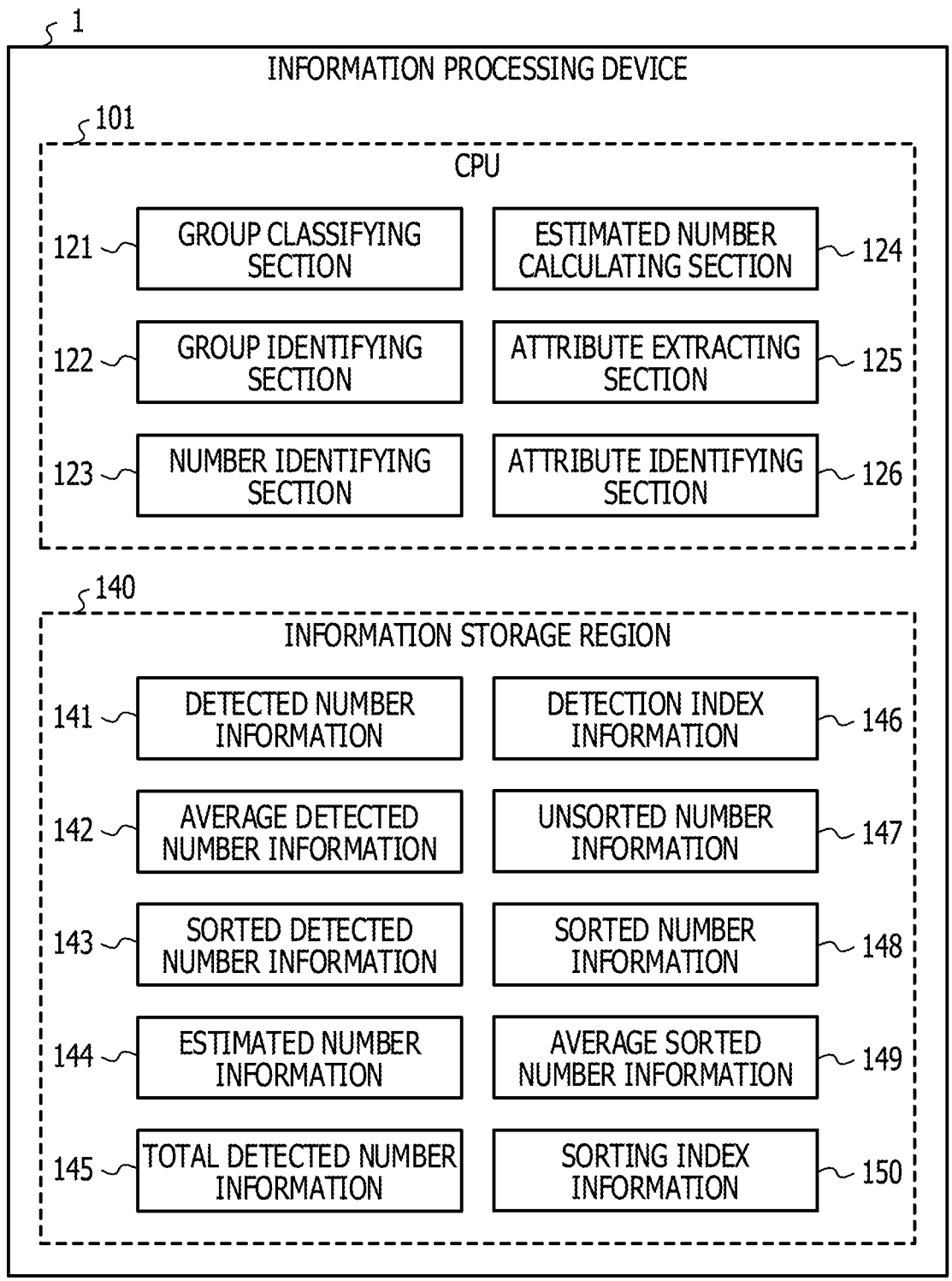
FIG. 9 is a functional block diagram of an information processing device according to a second embodiment.

Software Configuration of Information Processing Device According to Second Embodiment First, a software configuration of the information processing device 1 according to the second embodiment is described. FIG. 9 is a functional block diagram of the information processing device 1 according to the second embodiment.

The CPU 101 collaborates with the program 110, thereby operating as a group classifying section 121, a group identifying section 122, a number identifying section 123, an estimated number calculating section 124, an attribute extracting section 125, and an attribute identifying section 126, as illustrated in FIG. 9. In addition, as illustrated in FIG. 9, detected number information 141, average detected number information 142, sorted detected number information 143, estimated number information 144, total detected number information 145, and detection index information 146 are stored in an information storage region 140. In addition, as illustrated in FIG. 9, unsorted number information 147, sorted number information 148, average sorted number information 149, and sorting index information 150 are stored in the information storage region 140.

The group classifying section 121 classifies multiple radio terminals 3 located around and detected by the multiple imaging devices 2 into groups in such a manner that radio terminals 3 included in each of the groups have a predetermined relationship. Specifically, for example, the group classifying section 121 references positional information, acquired via Wi-Fi, of each of the target radio terminals 3 and identifies, for each of the multiple radio terminals 3, a detection time period from the time when the target radio terminal 3 is initially located in a shop to the time when the target radio terminal 3 is lastly located in the shop. Then, for example, the group classifying section 121 classifies, for each of the multiple radio terminals 3, the target radio terminal 3 and another radio terminal 3 located in such a manner that the ratio of a time period during which the distance between the target radio terminal 3 and the other radio terminal 3 is equal to or smaller than a first threshold to the detection time period is equal to or larger than a second threshold into the same group.

The group identifying section 122 identifies, for each of the multiple imaging devices 2, a group located around and detected by the imaging device 2 among the groups classified by the group classifying section 121. Specifically, the group identifying section 122 executes the group identification for each of predetermined time periods, for example.

The number identifying section 123 identifies, for each of the multiple imaging devices 2, the numbers of persons included in images captured by and acquired from the imaging devices 2. Specifically, the number identifying section 123 identifies the numbers of persons for each of the predetermined time periods, for example.

The estimated number calculating section 124 calculates, based on the groups identified by the group identifying section 122 and the numbers identified by the number identifying section 123, an estimated number of persons corresponding to radio terminals 3 included in each of the groups.

The attribute extracting section 125 extracts, for each of the multiple imaging devices 2, attributes of persons included in images captured by and acquired from the imaging devices 2.

The attribute identifying section 126 identifies attributes of persons corresponding to radio terminals 3 included in each of the groups identified by the group identifying section 122 based on the groups identified by the group identifying section 122, the estimated numbers calculated by the estimated number calculating section 124, and the attributes extracted by the attribute extracting section 125. The information stored in the information storage region 140 is described later.

Overview of Second Embodiment

Figure 10:
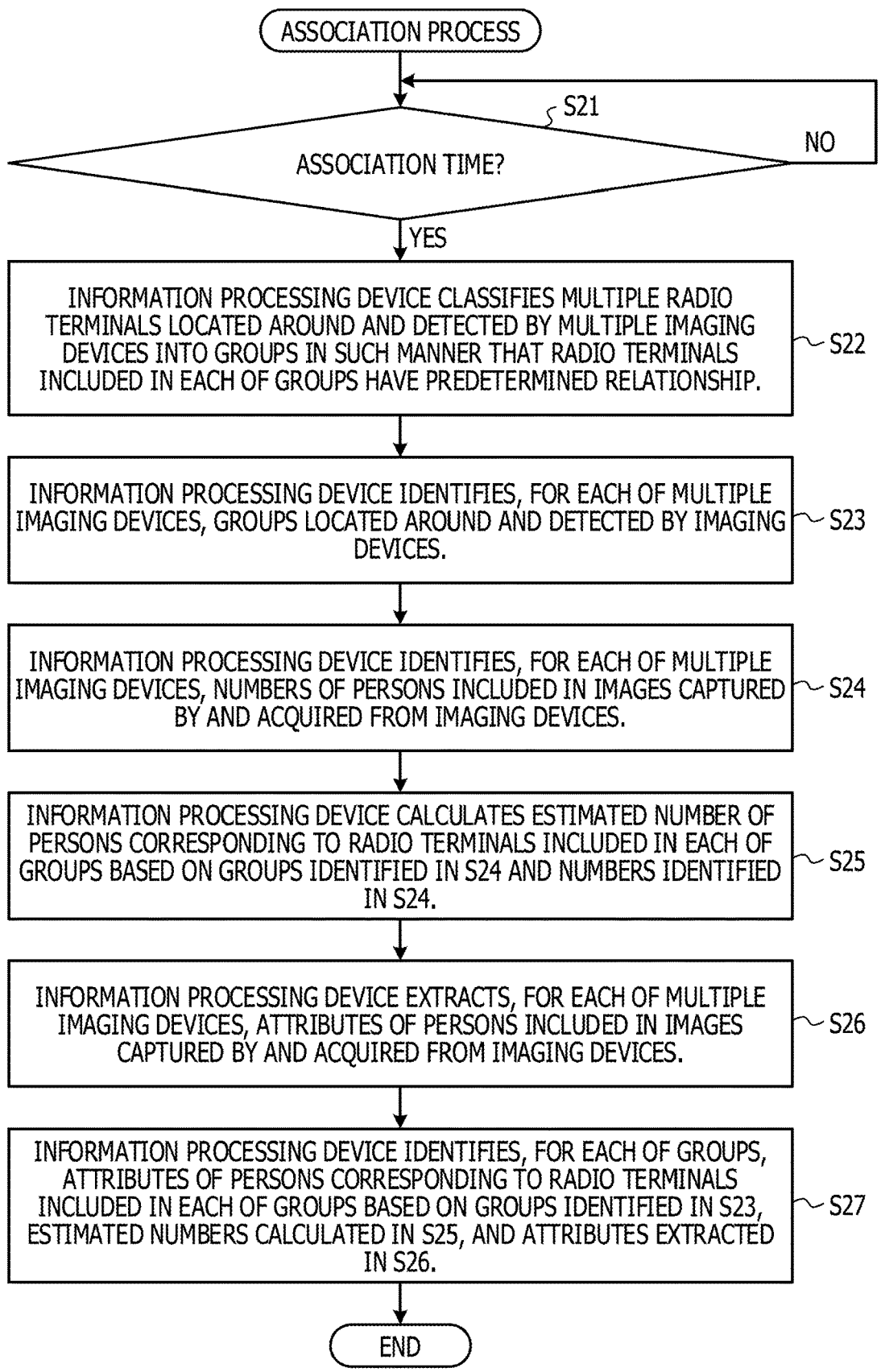
FIG. 10 is a flowchart describing an overview of an association process according to the second embodiment.
Figure 11:
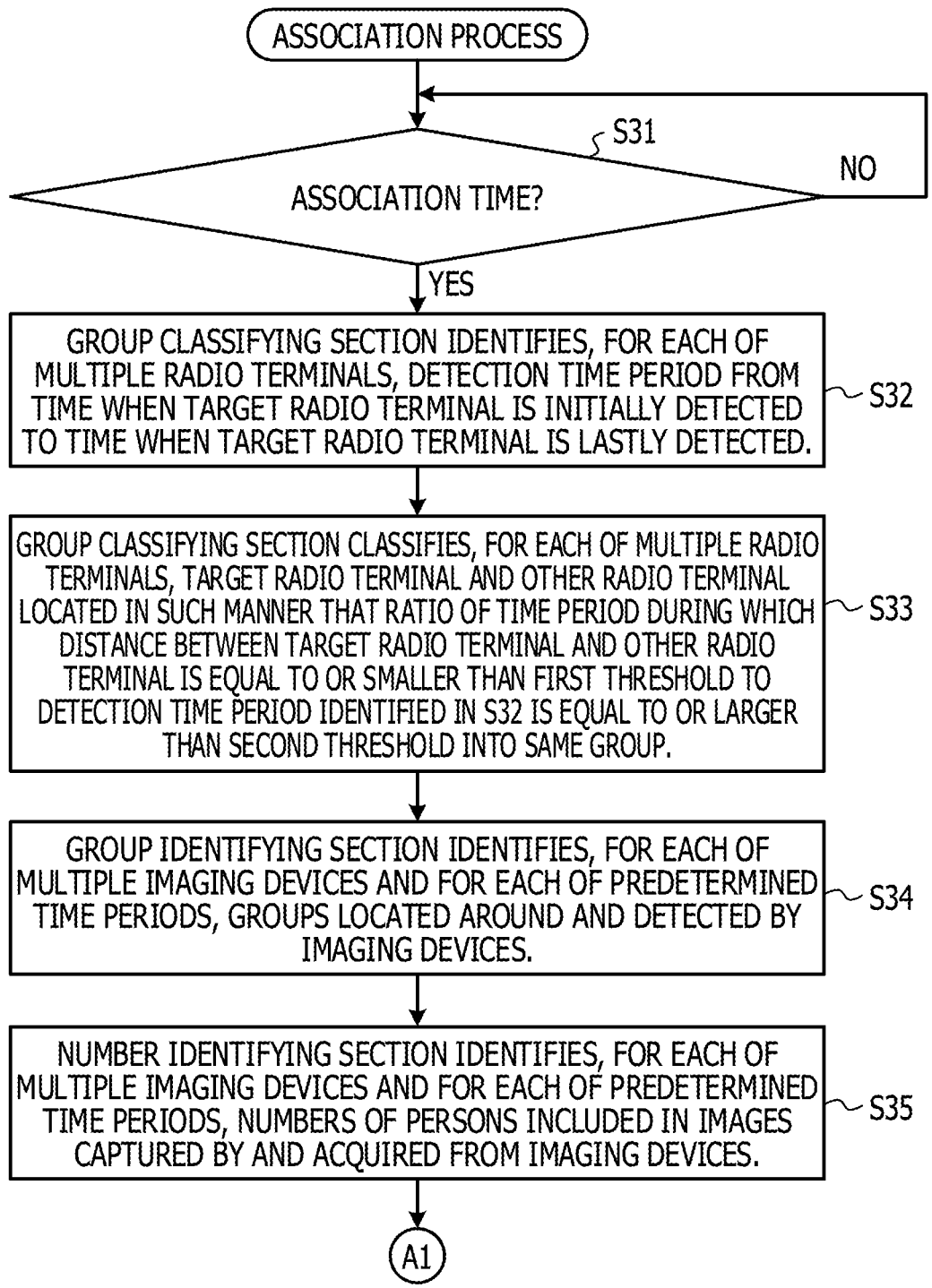
FIG. 11 is a flowchart describing details of the association process according to the second embodiment.
Figure 12:
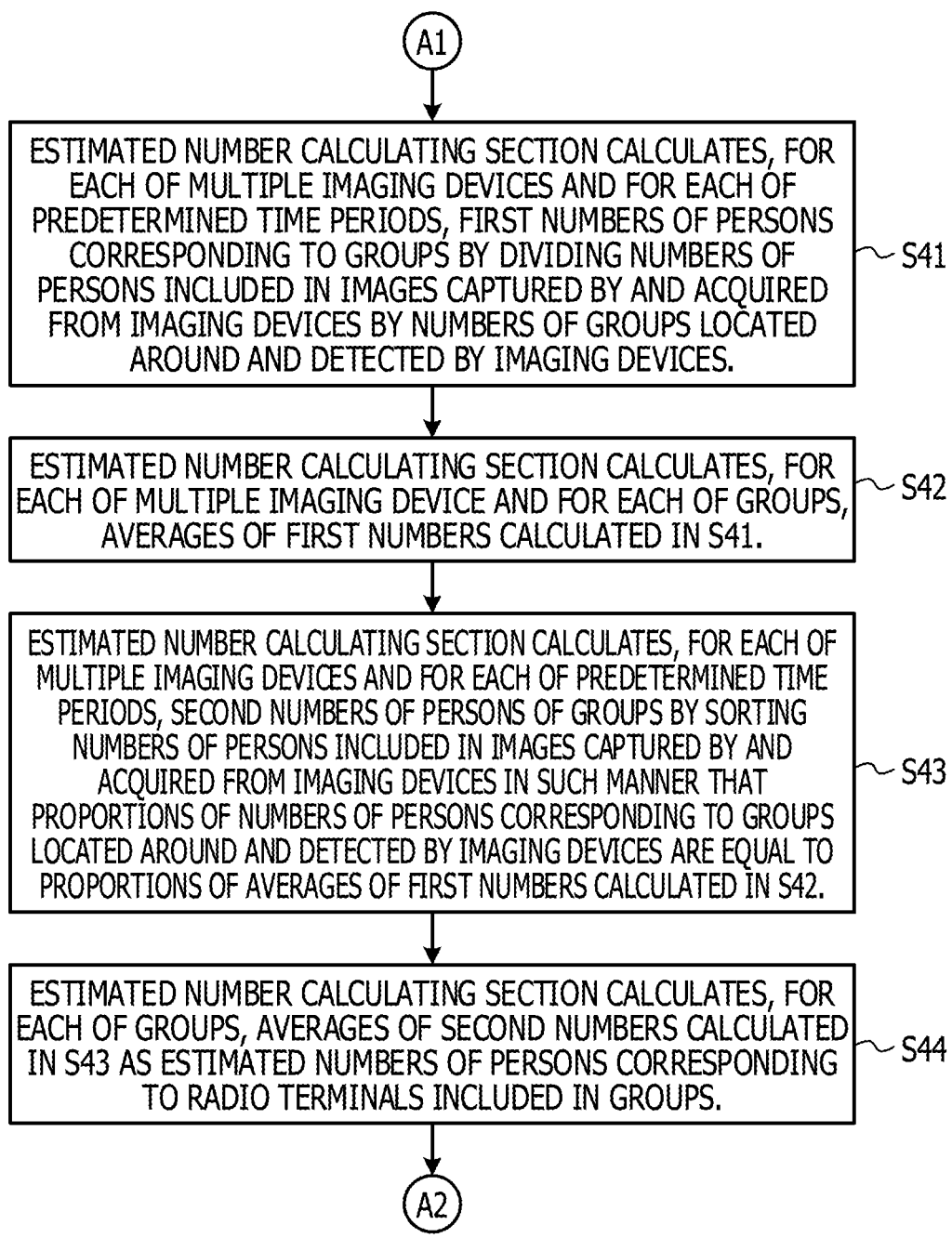
FIG. 12 is a flowchart describing the details of the association process according to the second embodiment.
Figure 13:
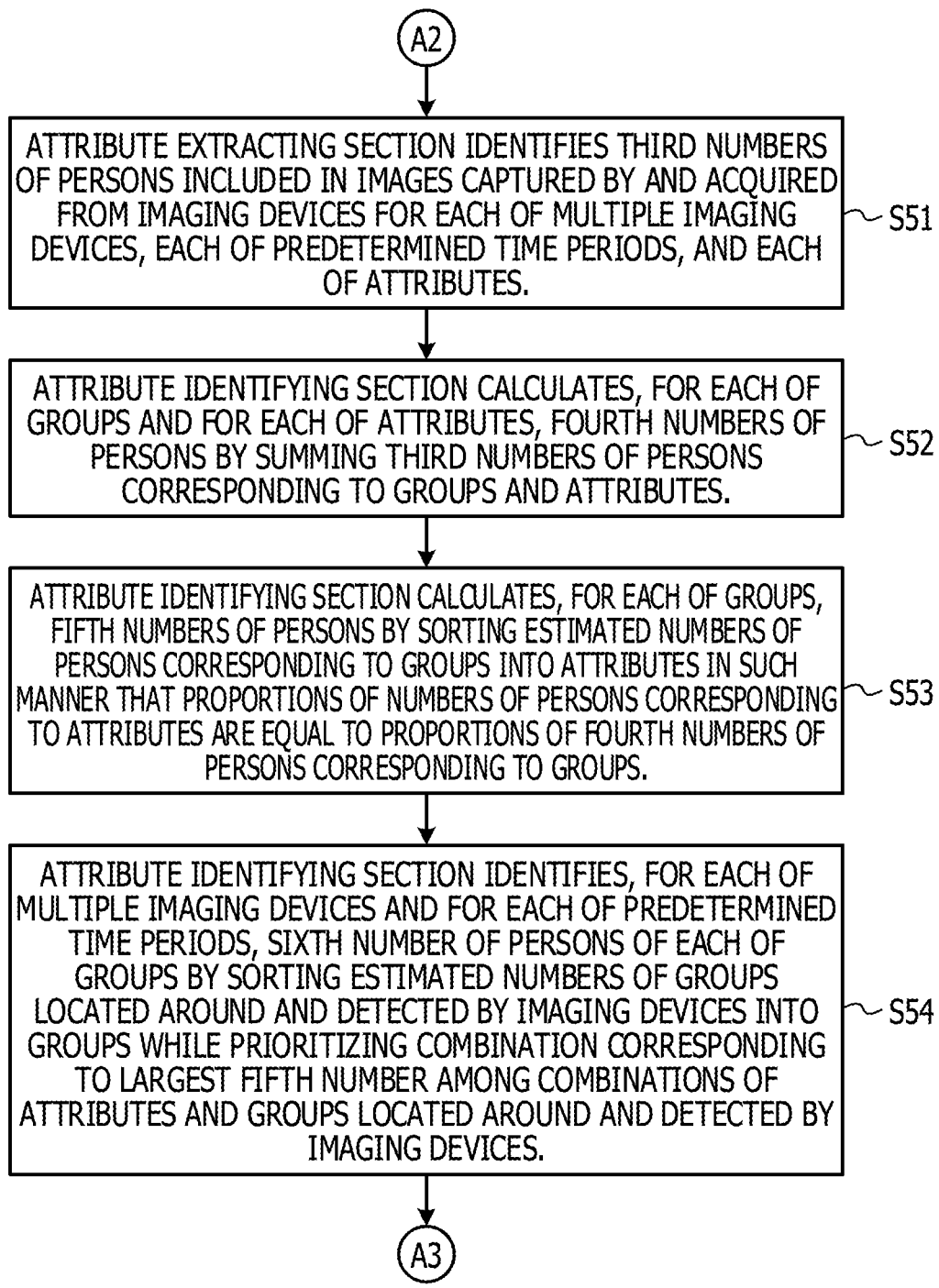
FIG. 13 is a flowchart describing the details of the association process according to the second embodiment.
Figure 14:
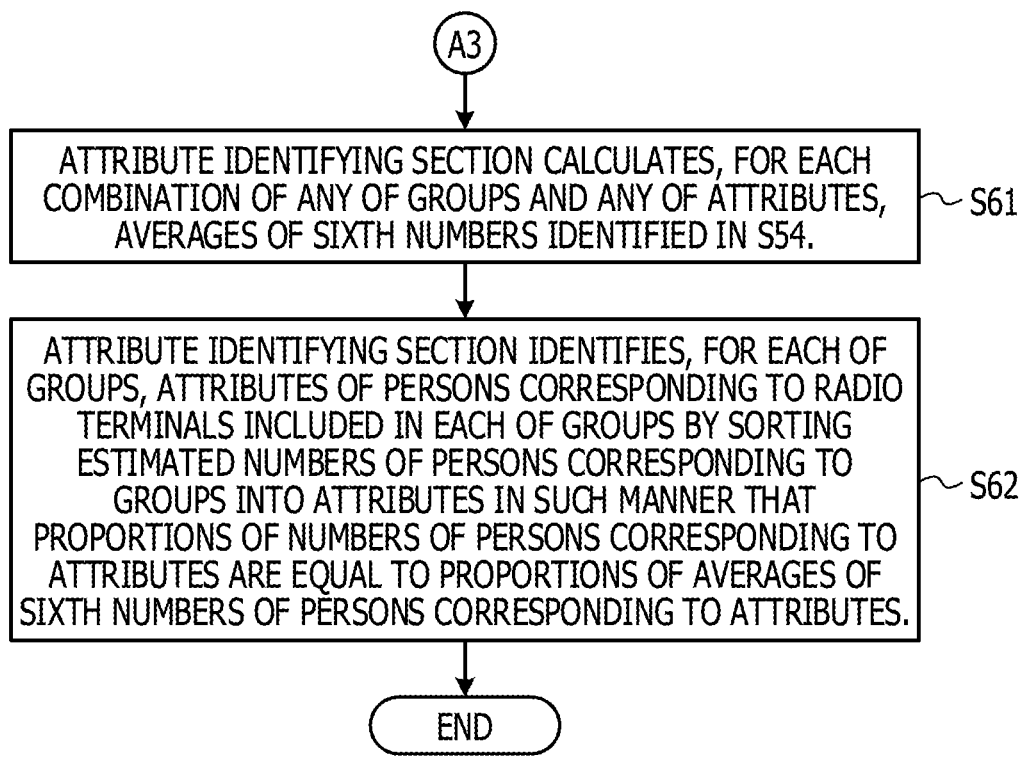
FIG. 14 is a flowchart describing the details of the association process according to the second embodiment.

Next, an overview of the second embodiment is described. FIG. 10 is a flowchart describing an overview of the association process according to the second embodiment.

The information processing device 1 stands by until association time (NO in S21). When the current time reaches the association time (YES in S21), the information processing device 1 classifies multiple radio terminals 3 located around and detected by the multiple imaging devices 2 into groups in such a manner that radio terminals 3 included in each of the groups have a predetermined relationship (in S22).

Subsequently, the information processing device 1 identifies, for each of the multiple imaging devices 2, groups located around and detected by the imaging devices 2 (in S23). In addition, the information processing device 1 identifies, for each of the multiple imaging devices 2, the numbers of persons included in images captured by and acquired from the imaging devices 2 (in S24).

After that, the information processing device 1 calculates an estimated number of persons corresponding to radio terminals 3 included in each of the groups based on the groups identified in process S23 and the numbers identified in process S24 (in S25).

Specifically, for example, the information processing device 1 sorts the numbers, identified in process S24, of persons into the groups identified in process S23 for each of the multiple imaging devices 2. Then, for example, the information processing device 1 calculates, for each of the groups identified in process S23, an estimated number of persons corresponding to radio terminals 3 included in each of the groups by averaging the numbers of the persons sorted into the groups for each of the multiple imaging devices 2.

Thus, the information processing device 1 may calculate estimated numbers of the persons corresponding to the radio terminals 3 included in the groups and including a shop visitor who does not own a radio terminal 3.

Then, the information processing device 1 extracts, for each of the multiple imaging devices 2, attributes of the persons included in the images captured by and acquired from the multiple imaging devices 2 (in S26). In addition, the information processing device 1 identifies, for each of the groups, the attributes of the persons included in the images captured by and acquired from the multiple imaging devices 2 based on the groups identified in process S23, the estimated numbers calculated in process S25, and the attributes extracted in process S26 (in S27).

Specifically, the information processing device 1 sorts, for each of the groups identified in process S23, the estimated numbers, calculated in process S25, of persons into the persons' attributes extracted in process S26.

Thus, the information processing device 1 may identify attributes of an estimated number of persons corresponding to radio terminals 3 included in each of the groups. In addition, even if the proportions of the numbers of shop visitors who correspond to attributes and exist in the shops are different from each other, the information processing device 1 may associate shop visitors with attributes corresponding to small proportions.

Details of Second Embodiment

Next, details of the second embodiment are described. FIGS. 11 to 14 are flowcharts describing the details of the second embodiment. In addition, FIGS. 15 to 29 are diagrams describing details of the association process according to the second embodiment. The association process illustrated in FIGS. 11 to 14 is described with reference to FIGS. 15 to 29.

The group classifying section 121 of the information processing device 1 stands by until the association time (NO in S31).

When the current time reaches the association time (YES in S31), the group classifying section 121 identifies, for each of the multiple radio terminals 3, a detection time period from the time when the target radio terminal 3 is initially detected to the time when the target radio terminal 3 is lastly detected (in S32). Specifically, the group classifying section 121 identifies, for each of the multiple radio terminals 3, a detection time period from the time when the target radio terminal 3 is initially located in a shop to the time when the target radio terminal 3 is lastly located in the shop.

Subsequently, the group classifying section 121 classifies, for each of the multiple radio terminals 3, the target radio terminal 3 and another radio terminal 3 located in such a manner that the ratio of a time period during which the distance between the target radio terminal 3 and the other radio terminal 3 is equal to or smaller than the first threshold to the detection time period is equal to or larger than the second threshold into the same group (in S33).

Thus, the group classifying section 121 may classify shop visitors into multiple groups while distinguishing between shop visitors who have moved as a group and shop visitors who have temporarily moved in a similar manner.

After that, the group identifying section 122 identifies, for each of the multiple imaging devices 2 and for each of the predetermined time periods, groups located around and detected by the imaging devices 2 (in S34). In addition, the number identifying section 123 identifies, for each of the multiple imaging devices 2 and for each of the predetermined time periods, the numbers of persons included in images captured by and acquired from the imaging devices 2 (in S35). Then, the group identifying section 122 and the number identifying section 123 generate detected number information 141 including the identified groups and the identified numbers and cause the generated detected number information 141 to be stored in the information storage region 140. Specific examples of the detected number information 141 are described below.

Specific Examples of Detected Number Information

FIGS. 15A and 15B are diagrams describing the specific examples of the detected number information 141. Specifically, FIG. 15A is a diagram describing a specific example of detected number information 141a indicating the numbers of persons included in images captured by the imaging device 2a described with reference to FIG. 1. FIG. 15B is a diagram describing a specific example of detected number information 141b indicating the numbers of persons included in images captured by the imaging device 2b described with reference to FIG. 1.

The detected number information 141 illustrated in FIGS. 15A and 15B includes, as items, "time" indicating time when the imaging devices 2 capture images and "group name" indicating identification information of groups located around and detected by the imaging devices 2. In "group name", "G1", "G2", "G3", and "G4" that indicate the groups, each of which includes one or more shop visitors, are set, for example. If a group does not exist around an imaging device 2, "-" is set in "group name".

The detected number information 141 illustrated in FIGS. 15A and 15B includes, as items, "men in their 20s" indicating the numbers of persons identified as men in their 20s among persons included in the images captured by the imaging devices 2 and "men in their 30s" indicating the numbers of persons identified as men in their 30s among the persons included in the images captured by the imaging devices 2. In addition, the detected number information 141 illustrated in FIGS. 15A and 15B includes, as items, "women in their 20s" indicating the numbers of persons identified as women in their 20s among the persons included in the images captured by the imaging devices 2 and "women in their 30s" indicating the numbers of persons identified as women in their 30s among the persons included in the images captured by the imaging devices 2. Furthermore, the detected number information 141 illustrated in FIGS. 15A and 15B includes, as an item, "total number of persons" indicating the total numbers of persons that are the totals of the numbers set in "men in their 20s", "men in their 30s", "women in their 20s", and "women in their 30s".

Specifically, in information in which "10:00" is set in "time" within the detected number information 141a illustrated in FIG. 15A, "G1" is set in "group name", "0 (persons)" is set in "men in their 20s", and "1 (person)" is set in "men in their 30s". In addition, in the information in which "10:00" is set in "time" within the detected number information 141a illustrated in FIG. 15A, "1 (person)" is set in "women in their 20s", "1 (person)" is set in "women in their 30s", and "3 (persons)" is set in "total number of persons". Specifically, the detected number information 141a illustrated in FIG. 15A indicates that a group having the identification information item "G1" has existed around the imaging device 2a at 10 o'clock. In addition, the detected number information 141a illustrated in FIG. 15A indicates that one man in his 30s, one woman in her 20s, and one woman in her 30s are included in an image captured by the imaging device 2a at 10 o'clock. A description of other information included in the detected number information 141a illustrated in FIG. 15A and information included in the detected number information 141b illustrated in FIG. 15B is omitted.

Return to FIG. 12. The estimated number calculating section 124 of the information processing device 1 calculates, for each of the multiple imaging devices 2 and for each of the predetermined time periods, the numbers (hereinafter also referred to as first numbers) of persons corresponding to groups located around and detected by the imaging devices 2 by dividing the numbers of persons included in images captured by and acquired from the imaging devices 2 by the numbers of the groups located around and detected by the imaging devices 2 (in S41). Then, the estimated number calculating section 124 calculates, for each of the multiple imaging device 2 and for each of the groups, averages of the first numbers calculated in process S41 (in S42). Specifically, the estimated number calculating section 124 generates average detected number information 142 including the calculated first numbers and the averages of the first numbers and causes the generated average detected number information 142 to be stored in the information storage region 140. A specific example of the average detected number information 142 is described below.

Specific Example of Average Detected Number Information

FIG. 16 is a diagram describing the specific example of the average detected number information 142.

The average detected number information 142 illustrated in FIG. 16 includes, as items, "time" indicating time when the imaging devices 2 capture images, "group G1" indicating the group having the identification information G1, "group G2" indicating the group having the identification information G2, "group G3" indicating the group having the identification information G3, and "group G4" indicating the group having the identification information G4. This specific example assumes that values with two digits after decimal point are set in "group G1", "group G2", "group G3", and "group G4".

Specifically, in "total number of persons" in the information in which "10:00" is set in "time" and "G1" is included in "group name" within the detected number information 141a illustrated in FIG. 15A, "3 (persons)" is set. In addition, in the detected number information 141a illustrated in FIG. 15A, the number of information items set in "group name" in the information in which "10:00" is set in "time" is 1 (only "G1"). Thus, the estimated number calculating section 124 sets, as a first number, "3.00 (persons)" that is a value obtained by dividing "3 (persons)" by 1 in "group G1" in information in which "10:00" is set in "time", as illustrated in FIG. 16.

In addition, in "total number of persons" in information in which "11:00" is set in "time" and "G1" is included in "group name" within the detected number information 141a illustrated in FIG. 15A, "5 (persons)" is set. In addition, in the detected number information 141a illustrated in FIG. 15A, the number of information items set in "group name" in the information in which "11:00" is set in "time" is 2 ("G1" and "G3). Thus, the estimated number calculating section 124 sets, as a first number, "2.50 (persons)" that is a value obtained by dividing "5 (persons)" by 2 in "group G1" in information in which "11:00" is set in "time", as illustrated in FIG. 16.

In addition, in the detected number information 141a illustrated in FIG. 15A, information in which "12:00" is set in "time" and "G1" is included in "group name" does not exist. Thus, the estimated number calculating section 124 sets "-" indicating no information in "group G1" in information in which "12:00" is set in "time", as illustrated in FIG. 16.

In addition, the estimated number calculating section 124 calculates, as the average of the first numbers, "2.75 (persons)" that is the average of "3.00 (persons)" and "2.50 (persons)" that are the first numbers set in "group G1" in the information in which "10:00", "11:00", and "12:00" are set in "time" within the average detected number information 142 illustrated in FIG. 16. Then, the estimated number calculating section 124 sets, as the average of the first numbers, the calculated "2.75 (persons)" in "group G1" in information in which "average" is set in "time". A description of other information illustrated in FIG. 16 is omitted.

Return to FIG. 12. The estimated number calculating section 124 sorts, for each of the multiple imaging devices 2 and for each of the predetermined time periods, the numbers of the persons included in the images captured by and acquired from the imaging devices 2 into groups and calculates the numbers (hereinafter also referred to as second numbers) of the persons corresponding to the groups in such a manner that the proportions of the numbers of the persons corresponding to the groups located around and detected by the imaging devices 2 are equal to the proportions of the averages, calculated in process S42, of the first numbers (in S43). Specifically, the estimated number calculating section 124 generates sorted detected number information 143 including the calculated second numbers and causes the generated sorted detected number information 143 to be stored in the information storage region 140. Specific examples of the sorted detected number information 143 are described below.

Specific Examples of Sorted Detected Number Information

FIGS. 17A and 17B are diagrams describing the specific examples of the sorted detected number information 143. Specifically, FIG. 17A is a diagram describing a specific example of sorted detected number information 143a corresponding to persons included in images captured by the imaging device 2a described with reference to FIG. 1. FIG. 17B is a diagram describing a specific example of sorted detected number information 143b corresponding to persons included in images captured by the imaging device 2b described with reference to FIG. 1.

The sorted detected number information 143 illustrated in FIGS. 17A and 17B includes the same items as those of the average detected number information 142 described with reference to FIG. 16.

Specifically, only "G1" is set in "group name" in the information in which "10:00" is set in "time" within the detected number information 141a illustrated in FIG. 15A. In addition, "3 (persons)" is set in "total number of persons" in the information in which "10:00" is set in "time" within the detected number information 141a illustrated in FIG. 15A. Thus, the estimated number calculating section 124 sets, as a second number, "3 (persons)" in "group G1" in information in which "10:00" is set in "time", as illustrated in FIG. 17A.

On the other hand, "G1" and "G3" are set in "group name" in the information in which "11:00" is set in "time" within the detected number information 141a illustrated in FIG. 15A. In addition, "5 (persons)" is set in "total number of persons" in the information in which "11:00" is set in "time" within the detected number information 141a illustrated in FIG. 15A. Furthermore, "2.75 (persons)" and "2.92 (persons)" are set in "group G1" and "group G3" in the information in which "average" is set in "time" within the average detected number information 142 illustrated in FIG. 16. Thus, the estimated number calculating section 124 calculates "2.43 (persons)" and "2.57 (persons)" by dividing "5 (persons)" into the two values in such a manner that the proportions of the numbers of persons corresponding to the groups G1 and G3 after the division are "2.75 (persons)": "2.92 (persons)". Then, the estimated number calculating section 124 sets "2.43 (persons)" and "2.57 (persons)" as second numbers in "group G1" and "group G3" in information in which "11:00" is set in "time", as illustrated in FIG. 17A. A description of other information included in the sorted detected number information 143a illustrated in FIG. 17A and information included in the sorted detected number information 143b illustrated in FIG. 17B is omitted.

Return to FIG. 12. The estimated number calculating section 124 calculates, for each of the groups, averages of the second numbers calculated in process S43 as estimated numbers of the persons corresponding to the radio terminals 3 included in the groups (in S44). Specifically, the estimated number calculating section 124 generates estimated number information 144 including the calculated estimated numbers and causes the generated estimated number information 144 to be stored in the information storage region 140. A specific example of the estimated number information 144 is described below.

Specific Example of Estimated Number Information

FIG. 18 is a diagram describing the specific example of the estimated number information 144.

The estimated number information 144 illustrated in FIG. 18 includes, as items, "group name" identifying the groups, "average number of group persons" indicating averages of the numbers, included in the sorted detected number information 143, of persons, and "estimated number of persons" indicating estimated numbers, calculated from the information set in "average number of group persons", of persons. This specific example assumes that values with two digits after decimal point are set in "average number of group persons"

Specifically, in the sorted detected number information 143a illustrated in FIG. 17A and the sorted detected number information 143b illustrated in FIG. 17B, "3.00 (persons)" and "2.43 (persons)" are set as information corresponding to "group G1". Thus, the estimated number calculating section 124 sets "2.71 (persons)" that is the average of "3.00 (persons)" and "2.43 (persons)" in "average number of group persons" in information in which "G1" is set in "group name", as illustrated in FIG. 18. Then, as illustrated in FIG. 18, the estimated number calculating section 124 sets, in "estimated number of persons" in the information in which "G1" is set in "group name", "3 (persons)" calculated by rounding "2.71 (persons)", which is the number set in "average number of group persons", off to the closest whole number, for example. A description of other information illustrated in FIG. 18 is omitted.

After process S44, the estimated number calculating section 124 may repeatedly execute processes S43 and S44 by using information set in "average number of group persons" within the estimated number information 144 illustrated in FIG. 18 as the averages, calculated in process S42, of the first numbers, for example. In this case, the estimated number calculating section 124 may terminate processes S43 and S44 when differences between information set in "average number of group persons" due to the previous execution of process S44 and information set in "average number of group persons" due to the latest execution of process S44 are smaller than a certain value.

Thus, the estimated number calculating section 124 may calculate an estimated number of persons of each of groups with high accuracy.

Return to FIG. 13. The attribute extracting section 125 of the information processing device 1 identifies the numbers (hereinafter also referred to as third numbers) of the persons included in the images captured by and acquired from the multiple imaging devices 2 for each of the multiple imaging devices 2, each of predetermined time periods, and each of the attributes (in S51). Specifically, for example, the attribute extracting section 125 references the detected number information 141 described with reference to FIGS. 15A and 15B and identifies, as the third numbers, information set in "men in their 20s", "men in their 30s", "women in their 20s", and "women in their 30s".

Then, the attribute identifying section 126 calculates numbers (hereinafter also referred to as fourth numbers) of persons by summing the third numbers corresponding to the groups and the attributes (in S52). Specifically, for example, the attribute identifying section 126 generates total detected number information 145 including the calculated fourth numbers and causes the generated total detected number information 145 to be stored in the information storage region 140. A specific example of the total detected number information 145 is described below.

Specific Example of Total Detected Number Information

FIG. 19 is a diagram describing the specific example of the total detected number information 145. The total detected number information 145 illustrated in FIG. 19 includes, as items, "group name", "men in their 20s", "men in their 30s", "women in their 20s", and "women in their 30s" among the items of the detected number information 141 illustrated in FIGS. 15A and 15B.

Specifically, in the detected number information 141 illustrated in FIGS. 15A and 15B, the information in which "G1" is included in "group name" is the information in which "10:00" and "11:00" are set in "time" within the detected number information 141a illustrated in FIG. 15A. "0 (persons)" is set in "men in their 20s" in the aforementioned information. Thus, the attribute identifying section 126 sets "0 (persons)" as a fourth number in "men in their 20s" in information in which "G1" is set in "group name", as illustrated in FIG. 19.

In addition, in the detected number information 141 illustrated in FIGS. 15A and 15B, information in which "G2" is included in "group name" is information in which "12:00" is set in "time" within the detected number information 141a illustrated in FIG. 15A and information in which "10:00" and "11:00" are set in "time" within the detected number information 141b illustrated in FIG. 15B. "3 (persons)", "0 (persons)", and "0 (persons)" are set in "men in their 20s" in the aforementioned information. Thus, the attribute identifying section 126 sets "3 (persons)" as a fourth number in "men in their 20s" in information in which "G2" is set in "group name", as illustrated in FIG. 19. A description of other information illustrated in FIG. 19 is omitted.

Return to FIG. 13. The attribute identifying section 126 calculates, for each of the groups, the numbers (hereinafter also referred to as fifth numbers) of persons by sorting the estimated numbers of persons corresponding to the groups into the attributes in such a manner that the proportions of the numbers of persons corresponding to the attributes are equal to the proportions of the fourth numbers of persons corresponding to the attributes (in S53). Specifically, the attribute identifying section 126 generates detection index information 146 including the calculated fifth numbers and causes the generated detection index information 146 to be stored in the information storage region 140. A specific example of the detection index information 146 is described below.

Specific Example of Detection Index Information

FIG. 20 is a diagram describing the specific example of the detection index information 146.

The detection index information 146 illustrated in FIG. 20 includes, as items, "group name", "men in their 20s", "men in their 30s", "women in their 20s", and "women in their 30s", like the detected number information 141 illustrated in FIGS. 15A and 15B. In addition, the detection index information 146 illustrated in FIG. 20 includes, as an item, "number of unsorted persons" indicating an estimated number of persons of each of the groups. This specific example assumes that values with two digits after decimal point are set in "men in their 20s", "men in their 30s", "women in their 20s", and "women in their 30s" within the detection index information 146.

Specifically, "3 (persons)" is set in "estimated number of persons" in the information in which "G1" is set in "group name" within the estimated number information 144 described with reference to FIG. 18. Thus, the attribute identifying section 126 sets "3 (persons)" in "number of unsorted persons" in information in which "G1" is set in "group name", as illustrated in FIG. 20.

In addition, the attribute identifying section 126 calculates "0.00 (persons)", "0.75 (persons)", "1.50 (persons)", and "0.75 (persons)" by dividing "3 (persons)" set in "number of unsorted persons" into the four values in such a manner that the proportions of the four values are equal to the proportions ("0 (persons)", "2 (persons)", "4 (persons)", and "2 (persons)") of information items set in "men in their 20s", "men in their 30s", "women in their 20s", and "women in their 30s" in the information in which "G1" is set in "group name" within the total detected number information 145 described with reference to FIG. 19. Then, the attribute identifying section 126 sets, as fifth numbers, "0.00 (persons)", "0.75 (persons)", "1.50 (persons)", and "0.75 (persons)" in "men in their 20s", "men in their 30s", "women in their 20s", and "women in their 30s" in the information in which "G1" is set in "group name", as illustrated in FIG. 20. A description of other information illustrated in FIG. 20 is omitted.

Return to FIG. 13. The attribute identifying section 126 identifies, for each of the multiple imaging devices 2 and for each of the predetermined time periods, the number (hereinafter also referred to as sixth number) of persons included in each combination (hereinafter also merely referred to as combination) of any of the groups located around and detected by the imaging devices 2 and any of the attributes by sorting estimated numbers of persons corresponding to the groups located around and detected by the imaging devices 2 into the combinations while prioritizing a combination corresponding to the largest fifth number (in S54). A specific example of process S54 is described below.

Specific Example of Process S54

FIGS. 21 to 26 are diagrams describing the specific example of process S54.

In process S54, first, the attribute identifying section 126 generates, for each of the persons included in the images captured by the multiple imaging devices 2, unsorted number information 147 indicating the numbers of persons unsorted into the groups among the estimated numbers of persons corresponding to the groups and sorted number information 148 indicating the numbers of persons sorted into the groups. Specific examples of the unsorted number information 147 and specific examples of the sorted number information 148 are described below.

Specific Examples of Unsorted Number Information

First, the specific examples of the unsorted number information 147 are described. FIGS. 21A and 21B are diagrams describing the specific examples of the unsorted number information 147. Specifically, FIG. 21A describes a specific example of unsorted number information 147a included in the unsorted number information 147 and corresponding to the numbers of persons included in images captured by the imaging device 2a. FIG. 21B describes a specific example of unsorted number information 147b included in the unsorted number information 147 and corresponding to the numbers of persons included in images captured by the imaging device 2b.

The unsorted number information 147 illustrated in FIGS. 21A and 21B includes, as items, "time", "group name", "men in their 20s", "men in their 30s", "women in their 20s", and "women in their 30s" among the items of the detected number information 141 described with reference to FIGS. 15A and 15B.

Specifically, in the unsorted number information 147a illustrated in FIG. 21A and the unsorted number information 147b illustrated in FIG. 21B, information that is the same as the information set in the items of the detected number information 141a described with reference to FIG. 15A and the items of the detected number information 141b described with reference to FIG. 15B is set. Specifically, in the unsorted number information 147, information that is the same as information included in the detected number information 141 is set as initial values.

Specific Examples of Sorted Number Information

Next, the specific examples of the sorted number information 148 are described. FIGS. 22A and 22B are diagrams describing the specific examples of the sorted number information 148. Specifically, FIG. 22A describes a specific example of sorted number information 148a included in the sorted number information 148 and corresponding to the numbers of persons included in images captured by the imaging device 2a. FIG. 22B describes a specific example of sorted number information 148b included in the sorted number information 148 and corresponding to the numbers of persons included in images captured by the imaging device 2b.

The sorted number information 148 illustrated in FIGS. 22A and 22B includes, as items, "time", "group name", "men in their 20s", "men in their 30s", "women in their 20s", and "women in their 30s" among the items of the detected number information 141 described with reference to FIGS. 15A and 15B. In addition, the sorted number information 148 illustrated in FIGS. 22A and 22B includes, as an item, "number of sorted persons" indicating the numbers of persons sorted into the groups among the estimated numbers of persons corresponding to the groups.

Specifically, in the sorted number information 148a illustrated in FIG. 22A and the sorted number information 148b illustrated in FIG. 22B, "0" is set as initial values in all cells.

In process S54, the attribute identifying section 126 sorts the numbers, set in cells of the unsorted number information 147 described with reference to FIGS. 21A and 21B, of persons into the cells of the sorted number information 148 described with reference to FIGS. 22A and 22B. A specific example in the case where the unsorted number information 147 and the sorted number information 148 are updated is described below.

Specific Example in Case where Unsorted Number Information and Sorted Number Information are Updated In "group name" in information in which "11:00" is set in "time" within the unsorted number information 147a described with reference to FIG. 21A, "G1" and "G3" are set. The maximum value among information set in the attributes in information in which "G1" and "G3" are set in "group name" within the detection index information 146 described with reference to FIG. 20 is "1.50 (persons)" that is information set in "women in their 20s" in the information in which "G1" is set in "group name", and "1.50 (persons)" that is information set in "women in their 20s" in information in which "G3" is set in "group name".

Thus, the attribute identifying section 126 updates, to "1 (person)", information set in "women in their 20s" in information in which "G1" is set in "group name" within the sorted number information 148a, as indicated by an underscore in FIG. 23C. In addition, the attribute identifying section 126 updates, to "1 (person)", information set in "women in their 20s" in information in which "G3" is set in "group name" within the sorted number information 148a, as indicated by an underscore in FIG. 23C.

Then, the attribute identifying section 126 updates information set in "number of sorted persons" in the information in which "G1" is set in "group name" within the sorted number information 148a to "1" that is the sum of information items set in "men in their 20s", "men in their 30s", "women in their 20s", and "women in their 30s, as indicated by an underscore in FIG. 23C. In addition, the attribute identifying section 126 updates information set in "number of sorted persons" in the information in which "G3" is set in "group name" within the sorted number information 148a to "1" that is the sum of information items set in "men in their 20s", "men in their 30s", "women in their 20s", and "women in their 30s, as indicated by an underscore in FIG. 23C. Specifically, in this case, the attribute identifying section 126 identifies that a radio terminal 3 corresponding to a woman in her 20s is included in each of the groups G1 and G3.

After that, the attribute identifying section 126 updates "3 (persons)" that is information set in "women in their 20s" in the information in which "11:00" is set in "time" within the unsorted number information 147a illustrated in FIG. 21A to "1 (person)" obtained by subtracting "2 (persons)" that is the number of persons sorted into the groups G1 and G3 from "3 (persons)", as indicated by an underscore in FIG. 23A.

Then, the attribute identifying section 126 updates "3 (persons)" that is information set in "number of unsorted persons" in the information in which "G1" is set in "group name" within the detection index information 146 illustrated in FIG. 20 to "2 (persons)" obtained by subtracting "1 (person)" that is the number of persons sorted into the group G1 from "3 (persons)", as indicated by an underscore in FIG. 23B. In addition, the attribute identifying section 126 updates "3 (persons)" that is information set in "number of unsorted persons" in the information in which "G3" is set in "group name" within the detection index information 146 illustrated in FIG. 20 to "2 (persons)" obtained by subtracting "1 (person)" that is the number of persons sorted into the group G3 from "3 (persons)", as indicated by an underscore in FIG. 23B.

In addition, the attribute identifying section 126 updates "1.50 (persons)" that is information set in "women in their 20s" in the information in which "G1" is set in "group name" within the detection index information 146 illustrated in FIG. 20 to "0.50 (persons)" that is a value obtained by subtracting "1 (person)" that is the number of persons sorted into a combination of the group G1 and women in their 20s from "1.50 (persons)", as indicated by an underscore in FIG. 23B. In addition, the attribute identifying section 126 updates "1.50 (persons)" that is information set in "women in their 20s" in the information in which "G3" is set in "group name" within the detection index information 146 illustrated in FIG. 20 to "0.50 (persons)" that is a value obtained by subtracting "1 (person)" that is the number of persons sorted into a combination of the group G3 and women in their 20s from "1.50 (persons)", as indicated by an underscore in FIG. 23B. Specifically, since persons are already sorted into the combination of the group G1 and women in their 20s and the combination of the group G3 and women in their 20s, the attribute identifying section 126 reduces the information items corresponding to the combinations to which the persons are already sorted.

In the unsorted number information 147a illustrated in FIG. 23A, "1 (person)" is set in "men in their 30s", "women in their 20s", and "women in their 30s" in information in which "11:00" is set in "time", but "0" is set in "men in their 20s" in the information in which "11:00" is set in "time". Thus, for example, even if the maximum value among information set in the attributes in information in which "G1." or "G3" is set in "group name" within the detection index information 146 described with reference to FIG. 20 is information set in "men in their 20s" in the information in which "G1." or "G3" is set in "group name", the attribute identifying section 126 may not sort a person into a combination of the group G1 and men in their 20s or a combination of the group G3 and men in their 20s. In this case, for example, the attribute identifying section 126 may identify the next largest information item of the information item set in "men in their 20s" in the information in which "G1." or "G3" is set in "group name" among information set in the attributes in the information in which "G1." or "G3" is set in "group name". Then, the attribute identifying section 126 may sort a person into a combination corresponding to the identified information.

Subsequently, when states of the information are updated to states illustrated in FIGS. 23A to 23C, the maximum value among information set in the attributes in the information in which "G1." or "G3" is set in "group name" within the detection index information 146 described with reference to FIG. 23B is "0.75 (persons)" that is information set in "men in their 30s" in the information in which "G1." is set in "group name" and "0.75 (persons)" that is information set in "women in their 30s" in the information in which "G1." is set in "group name".

Thus, the attribute identifying section 126 updates, to "1 (person)", information set in "men in their 30s" in the information in which "G1." is set in "group name" within the sorted number information 148a, as indicated by an underscore in FIG. 24C. In addition, the attribute identifying section 126 updates, to "1 (person)", information set in "women in their 30s" in the information in which "G1." is set in "group name" within the sorted number information 148a, as indicated by an underscore in FIG. 24C.

Then, the attribute identifying section 126 updates "number of sorted persons" in the information in which "G1." is set in "group name" within the sorted number information 148a to "3" that is the sum of information items set in "men in their 20s", "men in their 30s", "women in their 20s", and "women in their 30s", as indicated by an underscore in FIG. 24C. Specifically, in this case, the attribute identifying section 126 identifies that a radio terminal 3 corresponding to a man in his 30s and a radio terminal 3 corresponding to a woman in her 30s are included in the group G1.

After that, the attribute identifying section 126 updates "1 (person)" that is information set in "men in their 30s" and "women in their 30s" in the information in which "11:00" is set in "time" within the unsorted number information 147a illustrated in FIG. 23A to "0 (persons)" obtained by subtracting "1 (person)" that is the number of persons sorted into the group G1 from "1 (person)", as indicated by underscores in FIG. 24A.

Then, the attribute identifying section 126 updates "2 (persons)" that is information set in "number of unsorted persons" in information in which "G1." is set in "group name" within the detection index information 146 illustrated in FIG. 23B to "0 (persons)" obtained by subtracting "2 (persons)" that is the number of persons sorted into the group G1 from "2 (persons)", as indicated by an underscore in FIG. 24B.

In addition, the attribute identifying section 126 updates "0.75 (persons)" that is information set in "men in their 30s" in the information in which "G1" is set in "group name" within the detection index information 146 illustrated in FIG. 23B to "−0.25 (persons)" calculated by subtracting "1 (person)" that is the number of persons sorted into a combination of the group G1 and men in their 30s from "0.75 (persons)", as indicated by an underscore in FIG. 24B. In addition, the attribute identifying section 126 updates "0.75 (persons)" that is information set in "women in their 30s" in the information in which "G1" is set in "group name" within the detection index information 146 illustrated in FIG. 23B to "−0.25 (persons)" calculated by subtracting "1 (person)" that is the number of persons sorted into a combination of the group G1 and women in their 30s from "0.75 (persons)", as indicated by an underscore in FIG. 24B. Specifically, since persons are already sorted into the combination of the group G1 and men in their 30s and the combination of the group G1 and the women in their 30s, the attribute identifying section 126 reduces the information items corresponding to the combinations to which the persons are already sorted.

The maximum value among the information set in the attributes in information in which "G1" or "G3" is set in "group name" within the detection index information 146 described with reference to FIG. 23B is both "0.75 (persons)" that is the information set in "men in their 30s" in the information in which "G1" is set in "group name" and "0.75 (persons)" that is the information set in "women in their 30s" in the information in which "G1" is set in "group name". Thus, for example, if information set in "number of unsorted persons" in the information in which "G1" is set in "group name" is "1 (person)", the attribute identifying section 126 does not sort a person into both of the combination of the group G1 and men in their 30s and the combination of the group G1 and women in their 30s.

In information corresponding to "men in their 30s" in the detection index information 146 illustrated in FIG. 23B, the next largest information item of "0.75 (persons)" is "0.64 (persons)" that is information set in "men in their 30s" in information in which "G3" is set in "group name". In information corresponding to "women in their 30s" in the detection index information 146 illustrated in FIG. 23B, the next largest information item of "0.75 (persons)" is "0.43 (persons)" that is information set in "women in their 30s" in the information in which "G3" is set in "group name". In this case, for example, the attribute identifying section 126 may sort a person into the combination, corresponding to the smaller value among the next largest values of "0.75 (persons)", of the group G1 and women in their 30s.

Thus, the attribute extracting section 125 may increase the probability at which persons are sorted into a combination corresponding to men in their 30s and a combination corresponding to women in their 30s.

Subsequently, when the states of the information are updated to states illustrated in FIGS. 24A, 24B, and 24C, the maximum value among information set in the attributes in information in which "G1" or "G3" is set in "group name" within the detection index information 146 described with reference to FIG. 24B is "0.50 (persons)" that is information set in "women in their 20s" in the information in which "G1" is set in "group name" and "0.50 (persons)" that is information set in "women in their 20s" in the information in which "G3" is set in "group name".

In "number of unsorted persons" in the information in which "G1" is set in "group name" within the detection index information 146 illustrated in FIG. 24B, "0 (persons)" is set. Specifically, the detection index information 146 illustrated in FIG. 24B indicates that the number of persons sorted into combinations corresponding to the group G1 has reached an estimated number of persons corresponding to the group G1. Thus, in this case, the attribute identifying section 126 does not sort a person into the combinations corresponding to the group G1.

Thus, the attribute identifying section 126 updates, to "2 (persons)", information set in "women in their 20s" in the information in which "G3" is set in "group name" within the sorted number information 148a, as indicated by an underscore in FIG. 25C. Specifically, in this case, the attribute identifying section 126 identifies that radio terminals 3 corresponding to women in their 20s are included in the group G3.

After that, in this case, the attribute identifying section 126 updates "1 (person)" that is information set in "women in their 20s" in the information in which "11:00" is set in "time" within the unsorted number information 147a illustrated in FIG. 24A to "0 (persons)" calculated by subtracting "1 (person)" that is the number of persons sorted into the group G3 from "1 (person)", as illustrated in FIG. 25A.

Then, in this case, the attribute identifying section 126 updates "2 (persons)" that is information set in "number of unsorted persons" in the information in which "G3" is set in "group name" within the detection index information 146 illustrated in FIG. 24B to "1 (person)" obtained by subtracting "1 (person)" that is the number of persons sorted into the group G3 from "2 (persons)", as indicated by an underscore in FIG. 25A.

In addition, the attribute identifying section 126 updates "0.50 (persons)" that is information set in "women in their 20s" in the information in which "G3" is set in "group name" within the detection index information 146 illustrated in FIG. 24B to "−0.50 (persons)" that is a value obtained by subtracting "1 (person)" that is the number of persons sorted into the combination of the group G3 and women in their 20s from "0.50 (persons)", as indicated by an underscore in FIG. 25B.

In all "men in their 20s", "men in their 30s", "women in their 20s", and "women in their 30s" within the unsorted number information 147a illustrated in FIG. 25A, "0 (persons)" is set. Specifically, the unsorted number information 147a illustrated in FIG. 25A indicates that the sorting of all persons included in an image captured by the imaging device 2a at 11 o'clock into the combinations has been completed.

After that, the attribute identifying section 126 executes process S54 until the sorting of persons that is executed for each of the imaging devices 2 and for each of the time periods (for each of images captured by the imaging devices 2) is completed, as indicated by sorted number information 148 illustrated in FIG. 26.

Return to FIG. 14. The attribute identifying section 126 calculates the average of the sixth numbers identified in process S54 for each combination of any of the groups and any of the attributes (in S61). Specifically, for example, the attribute identifying section 126 generates average sorted number information 149 including the calculated averages of the sixth numbers and causes the generated average sorted number information 149 to be stored in the information storage region 140. A specific example of the average sorted number information 149 is described below.

Specific Example of Average Sorted Number Information

FIG. 27 is a diagram describing the specific example of the average sorted number information 149.

The average sorted number information 149 illustrated in FIG. 27 includes, as items, "group name", "men in their 20s", "men in their 30s", "women in their 20s", and "women in their 30s" among the items of the detected number information 141 described with reference to FIGS. 15A and 15B.

Specifically, in "men in their 20s" in information in which "G1" is set in "group name" within the sorted number information 148 illustrated in FIG. 26, "0 (persons)" is set. Thus, the attribute identifying section 126 sets "0 (persons)" in "men in their 20s" in information in which "G1" is set in "group name", as illustrated in FIG. 27.

In addition, in "men in their 20s" in information in which "G3" is set in "group name" within the sorted number information 148 illustrated in FIG. 26, "0 (persons)" and "1 (person)" are set. Thus, the attribute identifying section 126 sets "0.5 (persons)" that is the average of "0 (persons)" and "1 (person)" in "men in their 20s" in information in which "G3" is set in "group name", as illustrated in FIG. 27. A description of other information illustrated in FIG. 27 is omitted.

Return to FIG. 14. The attribute identifying section 126 identifies attributes of persons corresponding to radio terminals 3 included in each of the groups by sorting estimated numbers of the persons corresponding to the radio terminals 3 included in the groups into the attributes in such a manner that the proportions of the numbers of persons corresponding to the attributes are equal to the proportions of the averages of the sixth numbers corresponding to the attributes (in S62). Specifically, the attribute identifying section 126 generates sorting index information 150 including the estimated numbers of persons sorted into the attributes and causes the generated sorting index information 150 to be stored in the information storage region 140. A specific example of the sorting index information 150 is described below.

Specific Example of Sorting Index Information

FIG. 28 is a diagram describing the specific example of the sorting index information 150.

The sorting index information 150 illustrated in FIG. 28 includes, as items, "group name", "men in their 20s", "men in their 30s", "women in their 20s", and "women in their 30s" among the items of the detected number information 141 described with reference to FIGS. 15A and 15B.

Specifically, the total of the numbers of persons that are set in "men in their 20s", "men in their 30s", "women in their 20s", and "women in their 30s" in the information in which "G1" is set in "group name" within the average sorted number information 149 described with reference to FIG. 27 is "3 (persons)" that is the same as a number set in "estimated number of persons" in the information in which "G1" is set in "group name" within the estimated number information 144 described with reference to FIG. 18. Thus, in this case, the attribute identifying section 126 sets, in "men in their 20s", "men in their 30s", "women in their 20s", and "women in their 30s" in information in which "G1" is set in "group name", the numbers set in "men in their 20s", "men in their 30s", "women in their 20s", and "women in their 30s" in the information in which "G1" is set in "group name" within the average sorted number information 149 described with reference to FIG. 27, as illustrated in FIG. 28.

The total of the numbers set in "men in their 20s" "men in their 30s", "women in their 20s", and "women in their 30s" in the information in which "G3" is set in "group name" within the average sorted number information 149 described with reference to FIG. 27 is "2.5 (persons)". In addition, the number set in "estimated number of persons" in information in which "G3" is set in "group name" within the estimated number information 144 described with reference to FIG. 18 is "3 (persons)". Thus, the attribute identifying section 126 calculates "0.6 (persons)", "0.6 (persons)", "1.8 (persons)", and "0 (persons)" by dividing "3 (persons)" into the four values in such a manner that the proportions of the four values after the division are equal to the proportions ("0.5 (persons)": "0.5 (persons)": "1.5 (persons)": "0 (persons)") of the information items set in "men in their 20s", "men in their 30s", "women in their 20s", and "women in their 30s" in the information in which "G3" is set in "group name" within the average sorted number information 149 described with reference to FIG. 27. Then, the attribute identifying section 126 sets "0.6 (persons)", "0.6 (persons)", "1.8 (persons)", and "0 (persons)" in "men in their 20s", "men in their 30s", "women in their 20s", and "women in their 30s" in information in which "G3" is set in "group name", as illustrated in FIG. 28. A description of other information illustrated in FIG. 28 is omitted.

The attribute identifying section 126 may convert values included in the sorting index information 150 described with reference to FIG. 28 to integers in process S62, for example.

Specifically, in the sorting index information 150 illustrated in FIG. 28, "0.6 (persons)", "0.6 (persons)", "1.8 (persons)", and "0 (persons)" are set in "men in their 20s", "men in their 30s", "women in their 20s", and "women in their 30s" in the information in which "G3" is set in "group name". Thus, for example, the attribute identifying section 126 rounds, up to "2 (persons)", "1.8 (persons)" that is the maximum value among "0.6 (persons)", "0.6 (persons)", "1.8 (persons)", and "0 (persons)" that indicate the numbers of persons and include decimal points, as illustrated in FIG. 29.

In the sorting number information 148 described with reference to FIG. 26, "0 (persons)" is set in "men in their 30s" and "women in their 30s" in information in which "unsorted" is set in "group name", while "1 (person)" is set in "men in their 20s" in the information in which "unsorted" is set in "group name". It is, therefore, likely that the actual number of men who correspond to radio terminals 3 included in the group G3 and are in their 20s is larger than "0.6 (persons)" that is the information set in "men in their 20s" in the information in which "G3" is set in "group name" within the sorting index information 150 illustrated in FIG. 28. Thus, in this case, the attribute identifying section 126 rounds, up to "1 (person)", "0.6 (persons)" that is the information set in "men in their 20s" in the information in which "G3" is set in "group name" within the sorting index information 150 illustrated in FIG. 28, as illustrated in FIG. 29. Then, the attribute identifying section 126 rounds, down to "0 (persons)", "0.6 (persons)" that is the information set in "men in their 30s" in the information in which "G3" is set in "group name" within the sorting index information 150 illustrated in FIG. 28.

Thus, the attribute identifying section 126 may convert values included in the sorting index information illustrated in FIG. 28 to integers in such a manner that the converted values are close to the actual numbers of persons who correspond to the radio terminals 3 included in the groups and correspond to the attributes.

In this manner, the information processing device 1 according to the second embodiment classifies multiple radio terminals 3 located around and detected by the multiple imaging devices 2 into groups in such a manner that radio terminals 3 of each of the groups have a predetermined relationship.

Then, the information processing device 1 identifies, for each of the multiple imaging devices 2, groups located around and detected by the multiple imaging devices 2. In addition, the information processing device 1 identifies, for each of the multiple imaging devices 2, the numbers of persons included in images captured by and acquired from the multiple imaging devices 2. Furthermore, the information processing device 1 calculates an estimated number of persons corresponding to radio terminals 3 included in each of the groups based on the identified groups and the identified numbers of persons.

After that, the information processing device 1 extracts, for each of the multiple imaging devices 2, attributes of the persons included in the images captured by and acquired from the imaging devices 2 and identifies attributes of persons corresponding to radio terminals 3 included in each of the groups based on the identified groups, the calculated estimated numbers of persons, and the extracted attributes.

Thus, the information processing device 1 may identify attributes of estimated numbers of persons corresponding to radio terminals 3 included in each of groups. In addition, even if the proportions of the numbers of shop visitors who visit shops and correspond to attributes vary, the information processing device 1 may associate shop visitors with attributes corresponding to small proportions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An association method executed by a computer, the association method comprising:
   receiving first information transmitted from a plurality of imaging devices having a camera and second information transmitted from a radio terminal,
   obtaining a plurality of images captured by a plurality of cameras based on the first information;
   detecting a plurality of radio terminals that is located near at least one of the plurality of cameras when the at least one of the plurality of cameras captures one of the plurality of images based on the second information;
   classifying the plurality of radio terminals into a plurality of groups in such a manner that radio terminals of each of the plurality of groups have a predetermined relationship;
   estimating, for each of the plurality of groups, a numbers of persons included in the plurality of groups;
   obtaining attributes corresponding to the persons included in the plurality of images;
   determining attributes of each of the plurality of groups based on the estimated numbers of persons and the attributes corresponding to the persons; and
   storing, into a memory, the determined attribute in association with identifiers corresponding to the plurality of groups, and
   wherein the classifying includes:
   identifying, for each of the plurality of radio terminals, a detection time period from a time when any one of the plurality of cameras has initially detected one of the plurality of radio terminals to a time when the any one of the plurality of cameras has lastly detected the one of the plurality of radio terminals; and
   classifying, for each of the plurality of radio terminals, specified terminals into a same group in the groups in a case where a ratio of a time period during the detection time period is equal to or greater than a first threshold, a specified period being a period in which the specified terminals are located closer than a second threshold.

2. The association method according to claim 1, wherein the numbers of persons is estimated by calculating an average value of number of persons identified in the plurality of images corresponding to each of the groups.

3. The association method according to claim 2, wherein the detecting and the identifying the numbers of persons are executed for each of predetermined time periods; wherein
   the estimating includes:
   calculating, for each of the plurality of cameras and for each of the predetermined time periods, first numbers of the persons corresponding to each of the plurality of groups corresponding to the plurality of cameras by dividing the numbers of the persons included in each of the plurality of images by the numbers of the groups corresponding to each of the plurality of cameras,
   calculating average values of the calculated first numbers for each of the plurality of cameras and for each of the groups,
   calculating, for each of the plurality of cameras and for each of the predetermined time periods, second numbers of the persons corresponding to each of the plurality of groups, the second numbers of the persons being calculated in such a manner that proportions of the second numbers of the persons corresponding to the plurality of groups are equal to the proportions of the averages of the first numbers of the persons corresponding to the plurality of groups located near one of the plurality of cameras; and
   calculating, for each of the plurality of groups, averages of the calculated second numbers of persons as the estimated numbers of the persons corresponding to the plurality of radio terminals included in each of the plurality of groups.

4. The association method according to claim 3, wherein the obtaining the attributes includes identifying third numbers of the persons included in each of the plurality of images, each of the predetermined time periods; and wherein
   the determining the attributes includes:
   calculating, for each of the plurality of groups and for each of the attributes, fourth numbers of the persons by summing the third numbers of the persons corresponding to the plurality of groups and the attributes;
   calculating, for each of the plurality of groups, fifth numbers of persons by sorting the estimated numbers of the persons into the attributes in such a manner that proportions of the fifth numbers of the persons corresponding to the attributes are equal to proportions of the fourth numbers of the persons corresponding to the attributes;
   identifying, for each of the plurality of cameras and for each of the predetermined time periods, sixth numbers of persons for each of a plurality of combinations of any of the attributes and any of the plurality groups located near one of the plurality of cameras by sorting the estimated numbers of the persons corresponding to the plurality of groups located near one of the plurality of cameras into the plurality of combinations while prioritizing a combination, among the plurality of combinations, corresponds to the largest fifth number;
   calculating, for each of the plurality of combinations, averages of the identified sixth numbers of the persons; and
   identifying, for each of the plurality of groups, the attributes of the persons corresponding to the plurality of radio terminals included in each of the plurality of groups by sorting the estimated numbers of the persons corresponding to the plurality groups into the attributes in such a manner that the proportions of the numbers of the persons corresponding to the attributes are equal to the proportions of the averages of the sixth numbers of the persons corresponding to the attributes.

5. The association method according to claim 4, wherein the identifying the sixth numbers of the persons includes:
subtracting, every time an estimated number of persons are sorted into any of the plurality of combinations, the sorted number of the persons from the fifth number of persons corresponding to the combination into which the persons are sorted; and
sorting the estimated numbers of the persons corresponding to the plurality of groups in order from a combination, among the plurality of combinations, corresponding to the largest fifth number from which the sorted number of persons is subtracted, when the estimated numbers of the persons are to be sorted again.

6. The association method according to claim 5, wherein in the identifying the sixth numbers of the persons, when the number of persons sorted into a specific combination among the plurality of combinations reaches a third number of persons corresponding to the specific combination, the sorting into the specific combination is terminated.

7. The association method according to claim 5, further comprising:
terminating the sorting into combinations, included in the plurality of combinations, corresponding to a specific group when the number of persons that is obtained by summing the numbers of persons sorted into the combinations corresponding to the specific group reaches an estimated number of persons corresponding to the specific group.

8. A non-transitory computer-readable storage medium storing a program that causes a computer to execute a process, the process comprising:
receiving first information transmitted from a plurality of imaging devices having a camera and second information transmitted from a radio terminal,
obtaining a plurality of images captured by a plurality of cameras based on the first information;
detecting a plurality of radio terminals that is located near at least one of the plurality of cameras when the at least one of the plurality of cameras captures one of the plurality of images based on the second information;
classifying the plurality of radio terminals into a plurality of groups in such a manner that radio terminals of each of the plurality of groups have a predetermined relationship;
estimating, for each of the plurality of groups, a numbers of persons included in the plurality of groups;
obtaining attributes corresponding to the persons included in the plurality of images;
determining attributes of each of the plurality of groups based on the estimated numbers of persons and the attributes corresponding to the persons; and
storing, into a memory, the determined attribute in association with identifiers corresponding to the plurality of groups, and
wherein the classifying includes:
identifying, for each of the plurality of radio terminals, a detection time period from a time when any one of the plurality of cameras has initially detected one of the plurality of radio terminals to a time when the any one of the plurality of cameras has lastly detected the one of the plurality of radio terminals; and
classifying, for each of the plurality of radio terminals, specified terminals into a same group in the groups in a case where a ratio of a time period during the detection time period is equal to or greater than a first threshold, a specified period being a period in which the specified terminals are located closer than a second threshold.

* * * * *